US011520023B2

(12) United States Patent
Tsai et al.

(10) Patent No.: US 11,520,023 B2
(45) Date of Patent: Dec. 6, 2022

(54) HIGH-SPEED TIME-OF-INTERFERENCE LIGHT DETECTION AND RANGING APPARATUS

(71) Applicant: Optowaves, Inc., San Jose, CA (US)

(72) Inventors: Tsung-Han Tsai, Newton, MA (US); Jie Jensen Hou, El Dorato Hills, CA (US); Hao Wu, Wuhan (CN); Shanxing Su, Wuhan (CN)

(73) Assignee: Optowaves, Inc., San Jose, CA (US)

( * ) Notice: Subject to any disclaimer, the term of this patent is extended or adjusted under 35 U.S.C. 154(b) by 0 days.

(21) Appl. No.: 17/708,728

(22) Filed: Mar. 30, 2022

(65) Prior Publication Data

US 2022/0357437 A1 Nov. 10, 2022

Related U.S. Application Data

(63) Continuation-in-part of application No. 17/315,678, filed on May 10, 2021, now Pat. No. 11,294,040.

(51) Int. Cl.
*G01C 3/08* (2006.01)
*G01S 7/4865* (2020.01)
(Continued)

(52) U.S. Cl.
CPC .......... *G01S 7/4865* (2013.01); *G01S 7/484* (2013.01); *G01S 7/4863* (2013.01); *G01S 17/42* (2013.01); *G01S 17/894* (2020.01)

(58) Field of Classification Search
CPC ...... G01S 7/484; G01S 7/4865; G01S 7/4863; G01S 17/894; G01S 17/42
See application file for complete search history.

(56) References Cited

U.S. PATENT DOCUMENTS 3,901,597 A 8/1975 White
4,174,524 A 11/1979 Moran
(Continued)

FOREIGN PATENT DOCUMENTS

WO 2018/0172369 A1 9/2018

OTHER PUBLICATIONS

"FMCW-LIDAR with tunable twin-guide laser diode," by A. Dieckmann, Electronics Letters, vol. 30, No. 4, Feb. 17, 1994, 2 pages.
(Continued)

*Primary Examiner* — Mark Hellner
(74) *Attorney, Agent, or Firm* — Saile Ackerman LLC; Stephen B. Ackerman; Billy Knowles

(57) ABSTRACT

A TOI LiDAR System generates an image of an object based on the distance of various point measurements to the object. The TOI LiDAR System detects the envelope of an electrical signal created from an interference light signal. The interference light signal is produced from the back-reflected light resulting from a sampling arm light emission to the object combined with a reference light emission. The reference light emission is created by splitting a pulse-modulated coherent light source's emission signal and passing the reference light emission through a reference arm. The optical interference signal is transferred to a balanced photodetector to convert to an electrical signal converted to digital data. The digital data is evaluated to determine the rising edges or falling edges of a digitized electrical interference signal to determine a time delay between the reference light emission and back-reflected light used to calculate the distance.

30 Claims, 13 Drawing Sheets

(51) Int. Cl.
  *G01S 17/42*     (2006.01)
  *G01S 17/894*    (2020.01)
  *G01S 7/4863*    (2020.01)
  *G01S 7/484*     (2006.01)

(56) References Cited

U.S. PATENT DOCUMENTS

| | | | |
|---|---|---|---|
| 5,699,151 | A | 12/1997 | Akasu |
| 5,956,355 | A | 9/1999 | Swanson et al. |
| 6,822,745 | B2 | 11/2004 | De Groot et al. |
| 7,337,079 | B2 | 2/2008 | Park et al. |
| 8,179,521 | B2 | 5/2012 | Valla et al. |
| 8,558,993 | B2 | 10/2013 | Newbury et al. |
| 8,659,748 | B2 | 2/2014 | Dakin et al. |
| 8,675,184 | B2 | 3/2014 | Schmitt et al. |
| 9,383,447 | B2 | 7/2016 | Schmitt et al. |
| 9,677,870 | B2 | 6/2017 | Jensen |
| 9,702,975 | B2 | 7/2017 | Brinkmeyer et al. |
| 10,234,544 | B2 | 3/2019 | Ando et al. |
| 10,330,778 | B2 * | 6/2019 | Kaneda ............... G01S 7/483 |
| 10,416,292 | B2 | 9/2019 | de Mersseman et al. |
| 10,663,587 | B1 | 5/2020 | Sandborn et al. |
| 10,866,319 | B2 | 12/2020 | Brinkmeyer |
| 11,294,040 | B1 * | 4/2022 | Tsai ............... G01S 7/4865 |
| 2017/0350964 | A1 | 12/2017 | Kaneda |
| 2020/0200874 | A1 | 6/2020 | Donovan |
| 2021/0109218 | A1 | 4/2021 | Peters et al. |

OTHER PUBLICATIONS

"Generation of RF Intensity-Modulated Laser Pulses by Dual-Frequency Injection Seeding," by Lijun Cheng et al., IEEE Photonics Journal, vol. 10, No. 1, Feb. 2018, 10 pages.

"Sensitivity advantage of swept source and Fourier domain optical coherence tomography," by Michael A. Choma et al., Optics Express 2183, vol. 11, No. 18, Sep. 8, 2003, 7 pages.

"Understanding and Ameliorating Non-Linear Phase and Amplitude Responses in AMCW Lidar," by John P. Godbaz et al., Remote Sensing ISSN 2072-4292, www.mdpi.com/journal/remotesensing, © 2012 by the authors, 22 pages.

"Biaxial Resonant 7mm-MEMS Mirror for Automotive LIDAR application," bu Ulrich Hofmann et al., 2012 International Conference on Optical MEMS and Nanophotonics, Aug. 2012, pp. 150-151.

"Study on the Frequency-Modulated Continuous-Wave LiDAR Mutual Interference," by Il-Pyeong Hwang et al., 2019 IEEE 19th International Conference on Communication Technology, Oct. 16-19, 2019, pp. 1053-1056.

"Indium Phosphide Photonic Integrated Circuit Transceiver for FMCW LiDAR," by Brandon J. Isaac et al., IEEE Journal of Selected Topics in Quantum Electronics, vol. 25, No. 6, Nov./Dec. 2019, 7 pages.

"Polarization-diversity receiver using remotely delivered local oscillator without optical polarization control," by Honglin Ji et al., vol. 28, No. 15, Jul. 20, 2020, Optics Express 22882, 9 pages.

"Versatile endless optical polarization controller/tracker/demultiplexer," by Benjamin Koch et al., Apr. 2014, Optics Express 22(7):8259-76, DOI:10.1364/OE.22.008259, 18 pages.

"Novel Interferometric Method for the Measurement of Laser Wavelength/Frequency-Modulation Sensitivity," by M. Norgia et al, IMTC 2006—Instrumentation and Measurement Technology Conference, Sorrento, Italy, Apr. 24-27, 2006, pp. 444-447.

"A High Resolution, Chirped Pulse Lidar for Simultaneous Range and Velocity Measurements," by Mohammad Umar Piracha et al., CLEO:2011—Laser Applications to Photonic Applications, OSA Technical Digest (CD) (Optical Society of America, 2011), paper CMG1, 2 pages.

"Time-frequency analysis of long fiber Bragg gratings with low reflectivity," by Juan Sancho et al., Optics Express vol. 21, Issue 6, pp. 7171-7179, Mar. 25, 2013.

"Application of Time-Frequency Domain Reflectometry for Detection and Localization of a Fault on a Coaxial Cable," by Yong-June Shin et al., IEEE Transactions on Instrumentation and Measurement, vol. 54, No. 6, Dec. 2005, pp. 2493-2500.

"Realization of Multitone Continuous Wave Lidar," by Rasul Torun et al., IEEE Photonics Journal, vol. 11, No. 4, Aug. 2019, 11 pages.

"MEMS Laser Scanners: a Review," by Sven T. S. Holmstrom et al., Journal of Microelectromechanical Systems vol. 23, No. 2, Apr. 2014, pp. 259-275.

"MEMS Mirrors for LiDAR: a Review," by Dingkang Wang et al., Micromachines, MDPI, Apr. 27, 2020;11(5):456. doi: 10.3390/mi11050456, 24 pages.

"Comb-calibrated Frequency-modulated Continuous-wave Lidar," by Yang Xie et al., 2020 IEEE 7th International Workshop on Metrology for AeroSpace (MetroAeroSpace), Jun. 22-24, 2020, pp. 372-376.

"A Phase-Retrieving Coherent Receiver Based on Two-Dimensional Photodetector Array," by Yuki Yoshida et al., Journal of Lightwave Technology, vol. 38, No. 1, Jan. 1, 2020, pp. 90-100.

"A Survey on LiDAR Scanning Mechanisms," by Thinal Raj et al., Electronics 2020, 9(5), 741; https://doi.org/10.3390/electronics9050741, Apr. 30, 2020, 25 pages.

"Time-Stretched Femtosecond Lidar Using Microwave Photonic Signal Processing," by Lijie Zhao et al., Journal of Lightwave Technology, vol. 38, No. 22, Nov. 15, 2020, pp. 6265-6271.

"Coherent Detection of Backscattered Polarized Laser With Polarization Diversity Reception," by Yihua Hu et al., 2016 Fourth International Conference on Ubiquitous Positioning, Indoor Navigation and Location Based Services (UPINLBS), Nov. 2-4, 2016, pp. 271-277.

U.S. Office Action, U.S. Appl. No. 17/315,678, Applicant: Tsai et al., dated Jul. 15, 2021, 22 pages.

U.S. Notice of Allowance, U.S. Appl. No. 17/315,678, Applicant: Tsai et al., dated Nov. 26, 2021, 7 pages.

\* cited by examiner

HIGH-SPEED TIME-OF-INTERFERENCE LIGHT DETECTION AND RANGING APPARATUS

This is a continuation-in-part application of U.S. Ser. No. 17/315,678, filed on May 10, 2021, which is hereby incorporated by reference in its entirety, and assigned to a common assignee.

TECHNICAL FIELD

This disclosure relates generally to light detection and ranging systems. More particularly, this disclosure relates to light detection and ranging systems that utilize optical interferometry devices and methods to measure distance and speed.

BACKGROUND

Light detection and ranging (LiDAR) is analogous to radio detection and ranging (Radar) in that LiDAR uses optical waves to determine the range, angle, and velocity of objects. LiDAR utilizes differences in laser light return times and wavelengths that can be used to make digital 3-D representations of the target and has been broadly used in terrestrial, airborne, and mobile applications. A LiDAR instrument consists of one or more laser emitters, optics, a scanner, a photodetector, and a signal processor. The one or more laser emitters generate a coherent light beam transferred through a set of optics to a scanner to be transmitted to an object for determining the distance to the object or the object's velocity. In the case of three-dimensional (3D) scanning, the physical features are determined. The photodetector receives the coherent light reflected from the object and converts the coherent light to electrical signals that are processed to determine the object's distance. The emitter will generate the coherent light as pulses. The signal processor records the time of the transmitted pulse, and the time of the reception of the reflection of the coherent light is recorded. The distance is the difference between the transmitted time and the received time divided by two and multiplied by the speed of light.

Amplitude modulation continuous wave (AMCW) LiDAR is a phase-based form of LiDAR. Unlike direct pulse detection, the phase-based LiDAR emits a continuous laser signal. It modulates the laser emission amplitude with a high-speed radiofrequency (RF) signal to encode the output optical signal. The phase difference between the emitted signal and the reflected signal is detected for ranging. The phase shift of a sinusoidally-modulated continuous laser waveform can be used to infer the distance to an object.

Frequency modulated continuous wave (FMCW) LiDAR is similar to AMCW LiDAR, but the modulation and demodulation are performed optically rather than electrically. FMCW LiDAR uses a wavelength-tuning light source or a phase-modulating light source and an interferometer to measure the object's distance with good sensitivity. "Comb-Calibrated Frequency-Modulated Continuous-wave LiDAR," Y. Xie et al., 2020 IEEE 7th International Workshop on Metrology for AeroSpace (MetroAeroSpace), Pisa, Italy, 2020, pp. 372-376, Found Feb. 15, 2021 at URL: https://ieeexplore.ieee.org/stamp/stamp.jsp?tp=&arnumber=9160234&isnumber=9159966 describes FMCW LiDAR as very suitable for absolute distance measurement. The FMCW laser's frequency is linearly modulated by a carrier signal to accurately measure the laser round-trip flight time. The flight time can be calculated with high precision by detecting the beat frequency signal between the returned laser and the emitted laser. High-precision distance measurement can be achieved.

Time-of-interference (TOI) LiDAR technology is a new ranging method that overcomes limitations of traditional LiDAR techniques, including time-of-flight (ToF) and frequency-modulated continuous-wave (FWCW) with the following features: (1) utilization of an interferometer with balanced detector allowing highly sensitive detection of weak interference signals from long range; (2) time delay of the interference signal can be measured even when the signal frequency is high, and thus provides accurate measurement of the distance from the object, eliminating the need of high-speed data acquisition systems; (3) phase- or wavelength-modulation requirement of the light source is low and thus can simplify the complexity of the driver circuit design for the light source. The operating speed of TOI LiDAR systems is mainly limited by the modulation speed of the light source and the efficiency of the optical receiver.

SUMMARY

An object of this disclosure is to provide a high-speed time-of-interference (TOI) light detection and ranging (LiDAR) system that is based on time-frequency domain reflectometry and a small wavelength transient-modulation of the coherent light source. The high-speed TOI LiDAR system uses a time-to-digital converter or a data acquisition system to record the time delay of an interference signal or time-of-interference (TOI). The output wavelength is determined by the operating current or operating temperature of the coherent light source.

To accomplish this object, a high-speed TOI LiDAR system has a coherent light source connected to a modulating controller. The modulating controller is configured to generate a pulsed wavelength control signal that is transferred to the coherent light source. The pulsed wavelength control signal may be a current modulation signal or a laser ambient temperature adjustment signal. The pulsed wavelength control signal modulates the coherent light source to generate a pulsed wavelength-modulated coherent light emission.

The pulsed wavelength-modulated coherent light emission is an input to an interferometer. The interferometer is configured for partitioning the pulsed wavelength-modulated coherent light emission into a sampling portion and a reference portion. The pulsed wavelength-modulated coherent light emission's sampling portion is arranged to impinge upon an object to be measured. The reference portion of the pulsed wavelength-modulated coherent light emission is arranged to provide a reference basis for determining the distance from the TOI LiDAR system to the object. The interferometer further is configured for transferring the pulsed wavelength-modulated coherent light to a scanner. The scanner is configured to physically transfer the pulsed wavelength-modulated coherent light's first portion to the object and scan the object's surface with the pulsed wavelength-modulated coherent light. The scanner is further configured to receive a portion of the pulsed wavelength-modulated coherent light back-reflected from the object. The back-reflected pulsed wavelength-modulated coherent light is transferred from the scanner to the interferometer and then coupled with the reference portion of the pulsed wavelength-modulated coherent light to form an optical interference light signal.

The TOI LiDAR system has a photodetector array configured to convert the optical interference signal to an electrical interference signal. In various embodiments, the photodetector is configured as a polarization-diversity balanced amplified detector. The photodetector has at least one power monitor to measure the input power level to the photodetector. The power monitor output provides a modulated power level with a time delay associated with the object's distance.

The TOI LiDAR system has a signal processor configured to receive the electrical interference signal and convert the electrical interference signal to digital data representing the electrical interference signal amplitude as the digital data. The signal processor is configured to generate a displayed imaging range based on the distance from the target. The displayed imaging range is calculated by a computer system programmed to calculate the time delay determined by the optical interference signal.

The modulating controller is configured to generate a wavelength modulation control signal with a low duty cycle to modulate the coherent light source by controlling the narrow coherent light source's driving current, the temperature of the narrow bandwidth light source, or adjusting the phase of the light emitted from the light source. In other embodiments, the modulating controller will generate a pulsed phase control signal for generating interference when there is a time delay between light in the sample and reference arms of the interferometer.

In various embodiments, the interferometer includes a polarization controller used to adjust the polarization states of the coherent light emission from the light source and maximize the amplitude of the optical interference signal or electrical interference signal. The interferometer has a first coupler that receives the pulsed wavelength-modulated coherent light from the polarization controller. The coupler divides the pulsed wavelength-modulated coherent light. A first portion of the pulsed wavelength-modulated coherent light is fed into at least one sample arm. A second portion of the pulsed wavelength-modulated coherent light is fed to a reference arm. The interferometer has a circulator connected to receive the first portion of the pulsed wavelength-modulated coherent light from the at least one sample arm. The circulator is configured such that the pulsed wavelength-modulated coherent light from the sample arm enters the circulator and exits from the next port. Generally, the next port is a clockwise direction to direct the pulsed wavelength-modulated coherent light to the scanner. The scanner is configured to physically transfer the sample pulsed wavelength-modulated coherent light to scan the objects. The sampled pulsed wavelength-modulated coherent light is back-reflected from the object for making ranging measurements to the scanner and transferred to the circulator within the interferometer. The back-reflected pulsed wavelength-modulated coherent light is then transmitted from the circulator to a second coupler.

The interferometer's reference arm has a length greater than two times the sampling arm's length. The second portion of the pulsed wavelength-modulated coherent light in the reference arm is applied to the second coupler. The second portion of the pulsed wavelength-modulated coherent light transported in the reference arm is coupled with the collected back-reflected pulsed wavelength-modulated light to form an optical interference light signal. The optical interference light signal exits the second coupler to enter a photodetector array.

The reference arm's optical path length is longer than the sample arm's optical path length by more than two times the system's maximum ranging depth. The maximum frequency of the optical interference signal corresponds to the minimum ranging depth of the system.

The maximum frequency of the optical interference signal corresponds to the minimum ranging depth of the TOI LiDAR system. It is greater than a Nyquist sampling frequency of the digitizer in the data acquisition and signal processor. The minimum frequency of the optical interference signal corresponds to the maximum ranging depth of the TOI LiDAR system. The time delay of the detected optical interference is measured at the falling edge of the optical interference signal's envelope.

DETAILED DESCRIPTION

A TOI LiDAR System is configured to generate an image of an object based on the distance of various point measurements to the object. The TOI LiDAR System detects the envelope of an electrical signal created from an interference light signal. The interference light signal is produced from the back-reflected light resulting from a sampling arm light emission to the object and a reference light emission. The reference light emission is created by splitting a pulsed wavelength-modulated coherent light source's emission signal and passing the reference light emission through a reference arm. The optical interference signal is transferred to a photodetector for conversion to an electrical signal that is converted to digital data that is evaluated to determine falling edges of the reference light emission and the back-reflected light to determine a time delay between the reference light emission and back-reflected light. From the time delay, the distance is then calculated.

Figure 1A:
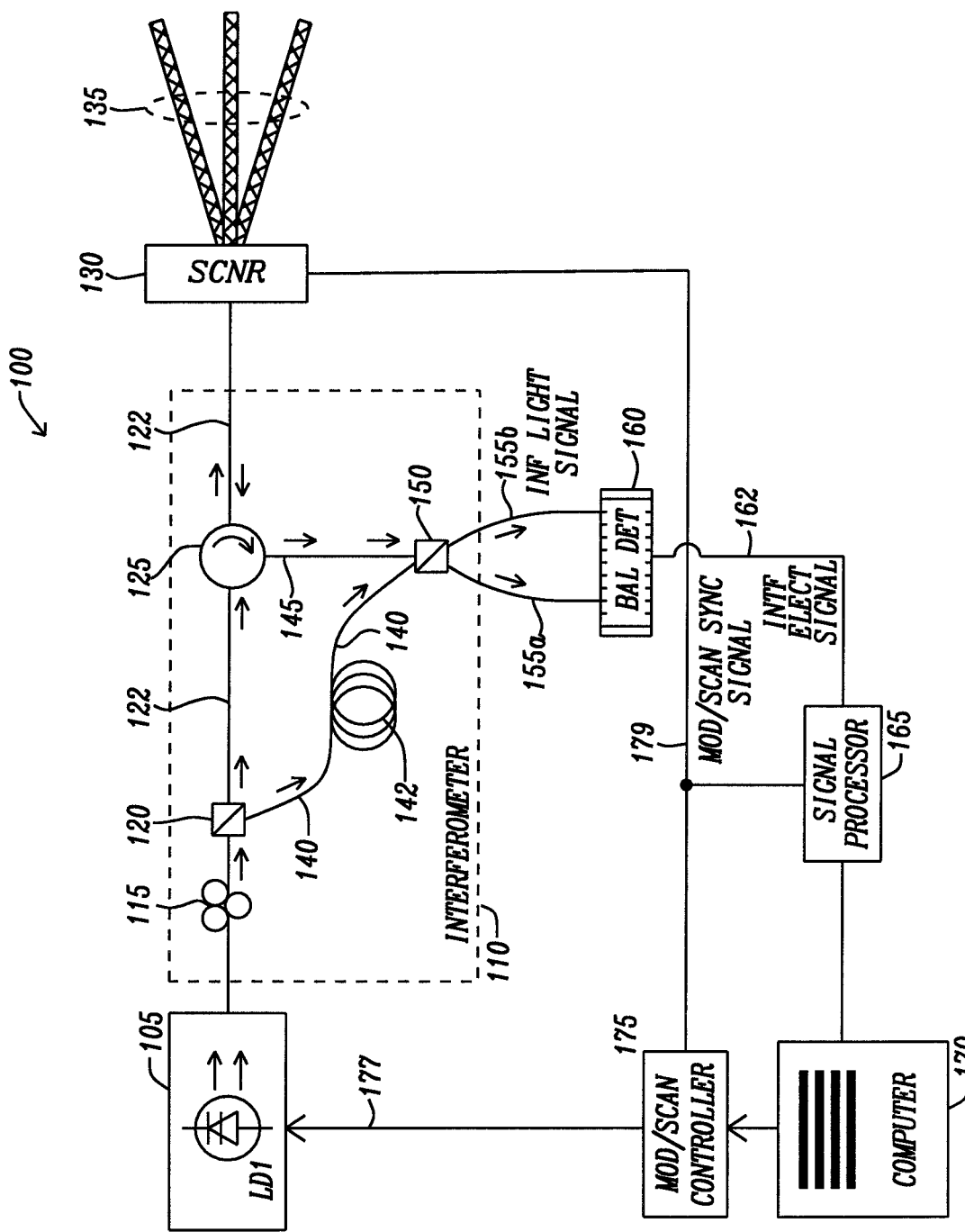
FIGS. 1A, 1B, 1C are schematic drawings of a TOI LiDAR System embodying the principles of the present disclosure.
Figure 1B:
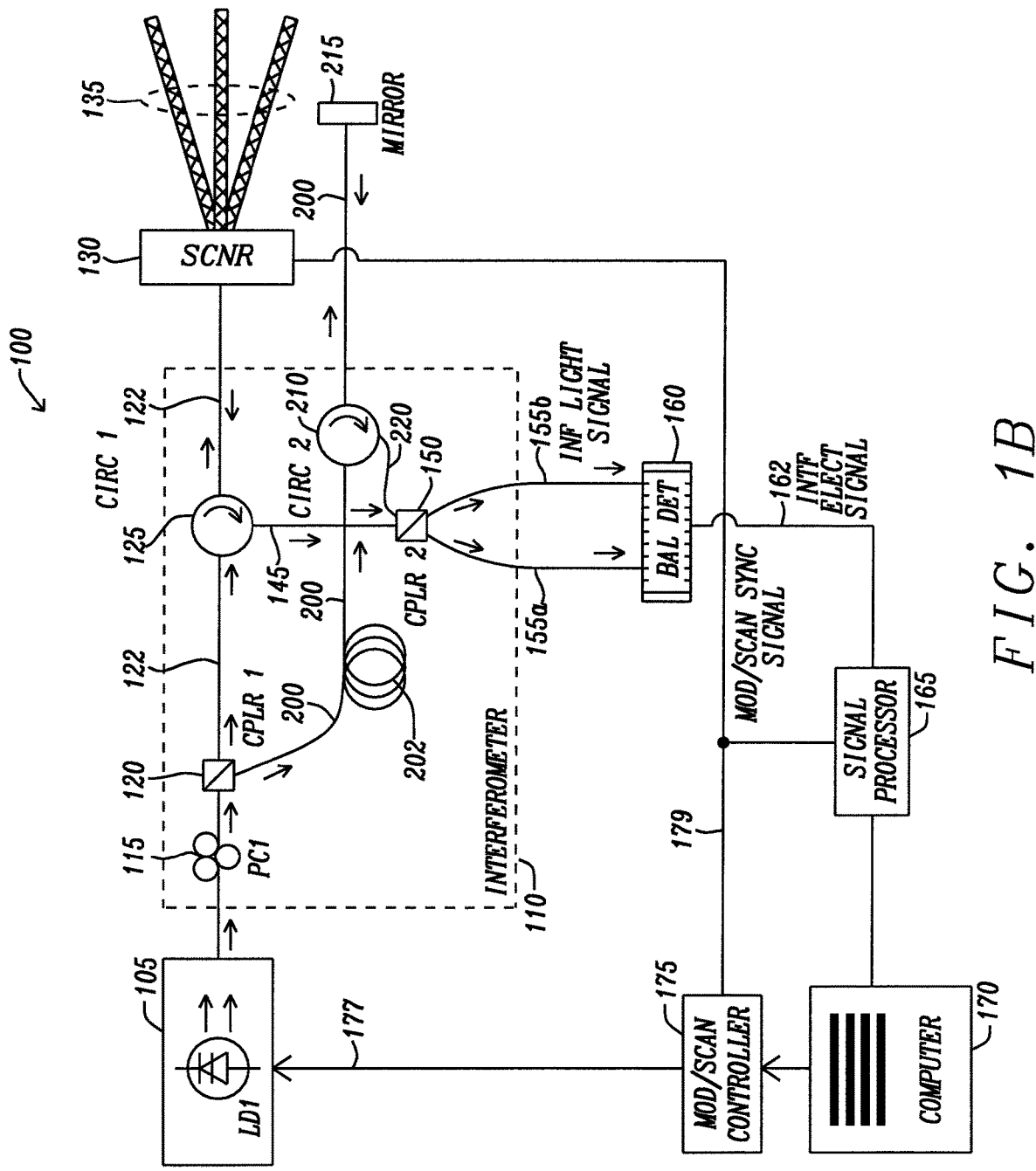
Figure 1C:
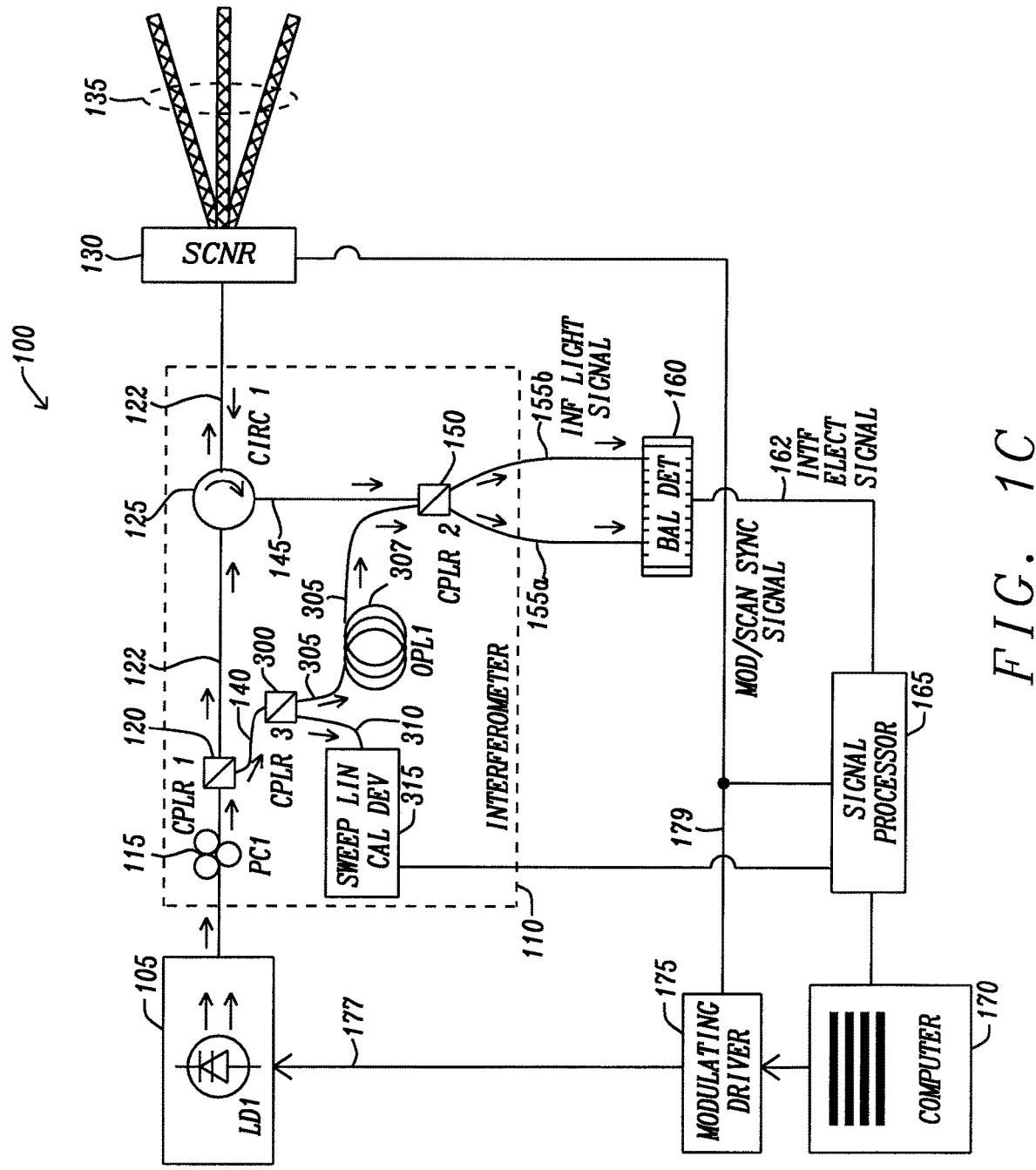

FIGS. 1A, 1B, 1C are schematic drawings of a TOI LiDAR System embodying the principles of the present disclosure. Referring to FIG. 1A, a TOI LiDAR system 100 includes a pulsed wavelength-modulated narrow bandwidth light source 105. The pulsed wavelength-modulated light source 105 emits a pulse modulated coherent light having an output spectrum composed of single or multiple longitudinal modes. A longitudinal mode of a resonant cavity is a particular standing wave pattern formed by waves confined in the cavity. In a laser, the light is amplified in a cavity resonator, usually composed of two or more mirrors. The cavity has mirrored walls that reflect the light to allow standing wave modes to exist in the cavity with little loss. The longitudinal modes correspond to the reflecting waves' wavelengths reinforced by constructive interference after many reflections from the cavity's reflecting surfaces. All other wavelengths are suppressed by destructive interference. A longitudinal mode pattern has its nodes located axially along the length of the cavity. The pulsed wavelength-modulated light source 105 is implemented as one of four types of lasers known in the art and categorized as a solid-state laser, a gas laser, a liquid laser, or a semiconductor laser. In the discussion of the structure of this disclosure, the pulsed wavelength-modulated light source 105 is shown as a coherent light source 105 with its wavelength or frequency controlled by either current or temperature. The modulation of the pulsed wavelength-modulated light source 105 is described hereinafter.

The pulsed wavelength-modulated narrow band light source 105 emits the pulsed wavelength-modulated coherent light to an interferometer 110. The pulsed wavelength-modulated narrow bandwidth light source 105 emissions are through free-space, an optical fiber, or an optical waveguide to the interferometer 110

The interferometer 110, in various embodiments, is implemented as fiber optics, bulk optics, integrated photonic circuitry, or some combinations thereof. The interferometer 110 has a polarization controller 115 that receives the pulsed wavelength-modulated coherent light. The polarization controller 115 adjusts the polarization states of the pulsed wavelength-modulated coherent light from the light source 105. It maximizes the amplitude of the optical interference signals transferred in the optical paths 155a and 155b or interference electrical signal 162. The pulsed wavelength-modulated coherent light from the light source 105 or the pulsed wavelength-modulated coherent light transferred through the polarization controller 115 is applied a coupler 120. The coupler 120 divides the coherent light into a sample portion fed into at least one sample arm 122 and a reference portion of the pulsed wavelength-modulated coherent light fed into a reference arm 140 within the interferometer 110.

The sample arm 122 and the reference arm 140 are implemented as a free-space path, an optical fiber, or an optical waveguide.

The interferometer 119 has a circulator 125 that receives the sample portion of the pulsed wavelength-modulated coherent light from the sample arm 122. The circulator 125 is configured such that the sample portion of the pulsed wavelength-modulated coherent light enters the circulator 125 and exits from the next port to a section of the sample arm 122. The next port is generally, but not required, in a clockwise direction to direct the coherent light through the sample arm 122 to a scanner 130. The scanner 130 is configured to physically transfer the sample pulsed wavelength-modulated coherent light 135 to scan the object. The sampled pulsed wavelength-modulated coherent light 135 is back-reflected from the object for making the ranging measurements. The back-reflected pulsed wavelength-modulated coherent light is received by the scanner 130 and transferred to the circulator 125. The back-reflected pulsed wavelength-modulated coherent light through the optical path 145 is then transferred to a second coupler 150. The optical path is implemented as a free-space path, an optical fiber, or an optical waveguide.

The reference arm 140, as implemented as a free-space path, an optical fiber, or an optical waveguide, has additional optical path 142 that provides additional path length such that the reference arm's 140 path length matches the maximum ranging depth of the TOI LiDAR system 100. The optical pulsed wavelength-modulated coherent light signals from the at least one sample arm 122 and the reference arm 140 are combined in the coupler 150 to generate an optical interference signal.

The pulsed wavelength-modulated coherent light signals from the at least one sample arm 122 and the reference arm 140 are heterodyne detected to extract the beating frequency from the base signal. The beating signal has a 180° phase difference in the two outputs from the coupler. The balanced detector 160 subtracts the signal from each input channel to extract the interference signal that is the beating signal.

The optical interference signal is applied to the optical paths 155a and 155b implemented as a free-space path, an optical fiber, or an optical waveguide. The optical interference signal is applied to the optical paths 155a and 155b is transferred to a balanced photodetector 160 to convert the optical interference signal from the optical paths 155a and 155b into an interference electrical signal 162.

The interference electrical signal 162 is generated by the balanced photodetector 160 and transferred to a data acquisition circuit within a signal processor 165, where the interference electrical signal 162 is converted into digital data. The maximum frequency of the optical interference signal corresponds to the minimum ranging depth of the TOI LiDAR system. The optical interference signal's maximum frequency is greater than a Nyquist sampling frequency of the digitizer in the data acquisition or the signal processor 165.

The minimum frequency of the optical interference signal as applied to optical paths 155a and 155b corresponds to the maximum ranging depth of the TOI LiDAR system 100. The time delay of the detected optical interference is measured at the falling edge of the optical interference signal's envelope.

The digital data is then transmitted to a computer 170 for further processing and display. The signal processor 165 in some embodiments may be integrated with the computer 170 as a single unit.

In various embodiments, the computer 170 is connected to a modulation/scanning controller 175. In other embodiments, the computer 170 is integrated with the modulation/scanning controller 175. The modulation/scanning controller 175 has a modulation subcircuit that determines the modulation, frequency, and shape of the modulation control signal 177 applied to the coherent light source 105. The modulation/scanning controller 175 further has a scanning control circuit that provides a modulation/scan synchronization signal 179 to the signal processor 165 and the scanner 130. The scanning control circuit creates a desired scan pattern that is used to generate appropriate modulation/scan synchronization signal 179 that is applied to the scanner 130

The scanner 130 may be implemented as a 1-dimensional or 2-dimensional scanner to distribute the sample pulsed wavelength-modulated coherent light 135 to form an image based on the TOI measurement. The 1-dimensional scanning pattern may be linear or non-linear in time and may be unidirectional or bidirectional. In some implementations of the TOI LiDAR system 100, the 2-dimensional scanning pattern may be linear or non-linear in time. It may be in the form of a raster scan, spiral scan, or other patterns to collect the measurement information. The scanner 130 may be realized mechanically as galvanometer mirrors, micro-electro-mechanical systems (MEMS), piezo actuators, optically including acousto-optic (AO) deflector, or a solid-state scanner. There may be other methods in keeping with the principles of the present disclosure of providing the required scanning motion to collect the measurement information.

Referring to FIG. 1B, the TOI LiDAR system 100 has the same structure as FIG. 1A, but the second portion of pulsed wavelength-modulated coherent light is applied to the reference arm 200. The fiberoptic cable of reference arm 200, as implemented as a free-space path, an optical fiber, or an optical waveguide, has an additional optical path 142 such that the reference arm's 200 optical path length matches the maximum ranging depth of the TOI LiDAR system 100. The pulsed wavelength-modulated coherent light in the reference arm 200 is applied to an input port of a second circulator 210. The pulsed wavelength-modulated coherent light is transmitted out the input/output port of the second circulator 210 to an additional segment of the reference arm 200. The coherent light impinges upon a mirror 215. The mirror 215 provides a delay in the coherent light and, in some embodiments, is replaced with an optical delay line. The mirror 215 directly reflects the coherent light back to the second circulator 210 and is directed to the coupler 150. The mirror reflected coherent light is coupled with the back-reflected pulsed wavelength-modulated coherent light to form the optical interference signal. The mirror 215 serves as a reference image plane corresponding to the maximum range of the TOI LiDAR system 100. The mirror 215 permits additional path length 202 to be half of the length if it is located between the second circulator 210 and the mirror 215 due to the double pass of the light. The mirror 215 permits cost savings and space savings.

The replacement of the mirror 215 with an optical delay line increases the flexibility of fine-tuning the total reference arm path length. The tunable range of the delay is typically in the order of centimeters, so it is mainly to accommodate the small change of system variation rather than changing the overall imaging range.

The optical interference signal is applied to the optical paths 155a and 155b implemented as a free-space path, an optical fiber, or an optical waveguide. The optical interference signal as applied to the optical paths 155a and 155b is transferred to a balanced photodetector 160 to convert the optical interference signal from the optical paths 155a and 155b into an interference electrical signal 162 as described above.

In some implementations, the reference arm 140 of FIG. 1A and 200 of FIG. 1B may have a longer optical path length than the sample arm 103. The timing of the interference of the pulsed wavelength-modulated coherent light signals from the sampling arm 122 and reference arm 140 and 200 is at the falling edge of the interference envelope. In various embodiments, the reference arm 140 and 200 may have a shorter optical path length than the sample arm 122. The timing of the interference of the pulsed wavelength-modulated coherent light signals from the sampling arm 122 and reference arm 140 and 200 is at the rising edge of the interference envelope.

Referring to FIG. 1C, the TOI LiDAR system 100 has the same structure as FIG. 1A, but the second portion of the pulsed wavelength-modulated coherent light of the reference arm 140 leaves the first coupler 120 enters a third coupler 300. The reference arm 140 is implemented as a free-space path, an optical fiber, or an optical waveguide. The third coupler 300 further divides the second portion of the pulsed wavelength-modulated coherent light into two pulsed wavelength-modulated coherent light beams. A first fraction of the second portion of the pulsed wavelength-modulated coherent light beams is applied to a second reference arm 305 that is similarly implemented as a free-space path, an optical fiber, or an optical waveguide. The second fraction of the second portion of the pulsed wavelength-modulated coherent light beam of the second reference arm 305 is applied to a sweep linear calibration device 315.

The sweep linear calibration device 315 is a Mach-Zehnder interferometer or a Fabry-Perot filter that generates an electrical signal to calibrate the coherent light source's 105 linearity of the wavelength sweep. If the wavelength modulation is not linear in the optical frequency domain, sweep linear calibration device 315 generates an interference signal from a fixed pathlength difference from either the Mach-Zehnder interferometer or a Fabry-Perot filter. It typically involves a photodetector or balanced detector to generate an electrical signal. Its zero-crossing timing corresponds to equal spaces in the optical frequency domain and provides an optical clock for the data acquisition system within the signal processor 165. The sweep linear calibration device 315 calibrates the interference signal 162 detected by the balanced detector 160. The output of the sweep linear calibration device 315 is transferred to the signal processor 165.

The reference arm's 305 second pulsed wavelength-modulated coherent light beam is applied to the second coupler 150. As described above, the back-reflected coherent light is directed to the coupler 150. The reference coherent light in the reference arm 305 is coupled with the back-reflected coherent light to form the optical interference signal. The optical interference signal is applied to optical path 155a, and 155b is implemented as a free-space path, an optical fiber, or an optical waveguide. The optical interference signal is transferred through the optical paths 155a and 155b to be transferred to a balanced photodetector 160 to convert the optical interference signal from the optical paths 155a and 155b into an interference electrical signal 162, as described above.

Figure 1D:
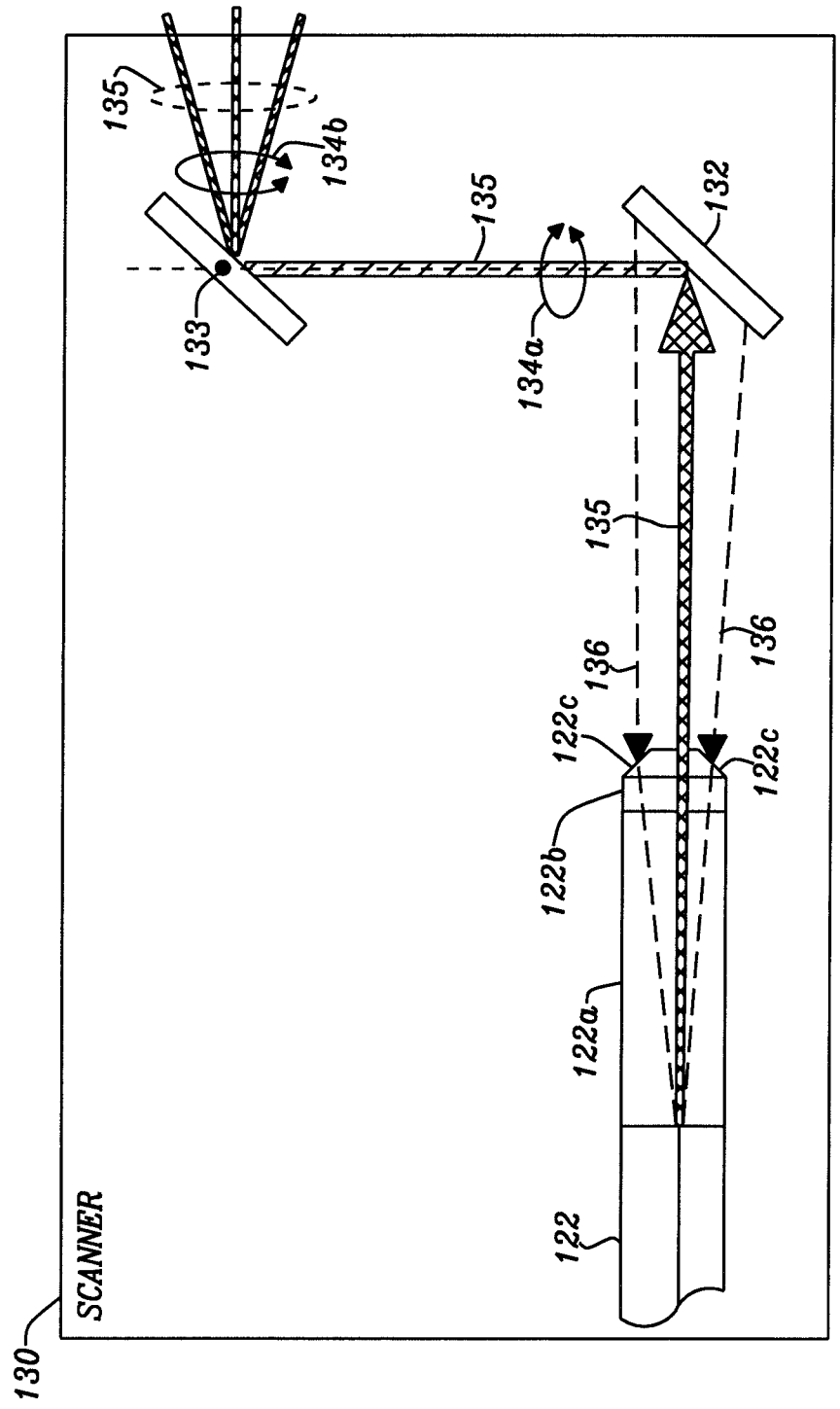
FIG. 1D is a schematic drawing of a scanner receiving graded-index lens of an end of the sampling arm of FIGS. 1A, 1B, and 1C embodying the principles of the present disclosure.

FIG. 1D is a schematic drawing of a scanner 130 configured for receiving the sampling arm 122 having fiber optic cable of FIGS. 1A, 1B, and 1C embodying the principles of the present disclosure. The sampling arm 122 is inserted and secured in scanner 130. The distal end of the sampling arm 122 is connected to or in contact with a graded-index fiber rod 122a. The graded-index fiber rod 122a has an engineered graded-index lens 122b that is formed as a distal surface of the graded-index fiber rod 121a to enhance overall efficiency for high-speed operation. As an alternate embodiment, the engineered graded-index lens 122b is formed as a separate lens in contact with the graded-index fiber rod 121a. A low numerical aperture is required of the graded-index fiber rod 121a with an engineered graded-index lens 122b for long-distance illumination, but a higher numerical aperture is required for receiving back-reflected pulsed wavelength-modulated coherent light from the object. The graded-index fiber rod 122a with an engineered graded-index lens 122b the on-axis sample pulsed wavelength-modulated coherent light 135 light coming out through the center portion of the engineered tip is collimated. The off-axis back-reflected pulsed wavelength-modulated coherent light 136 from the object going through the annular portion 122c of the engineered graded-index lens 122b is coupled back into the sampling arm 122. The graded-index fiber rod 122a with an engineered graded-index lens 122b is implemented as a gradient-index (GRIN) fiberoptic lens with single-mode fiber, a GRIN fiberoptic lens with few-mode fiber, a fiberoptic ball lens, a GRIN lens assembly, or a free-space collimator. Implementing the graded-index fiber rod 122a with an engineered graded-index lens 122b may combine any of the listed implementations. The engineered graded-index lens 122b is formed of a tapered tip, a Fresnel surface, a meta-surface, or a combination thereof.

The sampling arm 122 is inserted and secured in scanner 130. It radiates a pulsed wavelength-modulated coherent light 135 to a first mirror 132. The first mirror 132 is horizontally rotated 134a to reflect the pulsed wavelength-modulated coherent light 135 with a horizontal scan pattern. The horizontal scan pattern covers a desired field of view. The reflected pulsed wavelength-modulated coherent light 135 impinges upon a second mirror 133. The second mirror 133 is rotated vertically 134b to create a vertical scan pattern. The vertical scan pattern covers a vertical field of view.

The off-axis back-reflected pulsed wavelength-modulated coherent light 136 is reflected from the desired object to be measured and is back-reflected to the scanner 130 and thus to the second mirror 133 and then to the first mirror 132. off-axis back-reflected pulsed wavelength-modulated coherent light 136 is reflected and conveyed to the graded-index fiber rod 122a with an engineered graded-index lens 122b of the sampling arm 122. The off-axis back-reflected pulsed wavelength-modulated coherent light 136 transferred on an off-axis to the sampling arm 122 having a graded-index fiber rod 122a with an engineered graded-index lens 122b. The light transfers through the graded-index fiber rod 122a and is conveyed to the sampling arm 122 to be further processed.

Figure 2A:
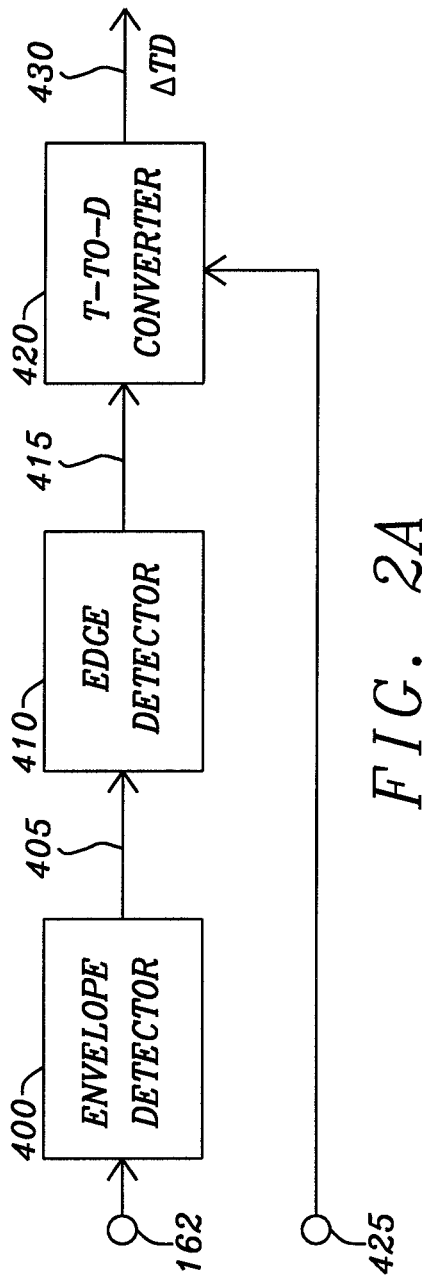
FIG. 2A is a block diagram of an electrical TOI measurement circuit embodying the principles of the present disclosure.

FIG. 2A is a block diagram of an electrical TOI measurement circuit embodying the principles of the present disclosure. The interference electrical signal 162 of FIGS. 1A, 1B, and 1C generated from the balanced detector 160 is received by an envelope detector 400 and converted to an envelope 405 of the interference electrical signal 162. The envelope detector 400 is implemented as a radiofrequency (RF) power detector, a root mean square (RMS) detector, or a frequency demodulator. The radiofrequency (RF) power detector, the root mean square (RMS) detector, or the frequency demodulator are known in the art and are commercially available devices. The radiofrequency (RF) power detector, the root mean square (RMS) detector, or the frequency demodulator remove the high-frequency components in the interference electrical signal 162 and thus identify the envelope of the interference electrical signal 162.

The envelope signal 405 is transferred to an edge detector 410. The edge detector 410 determines a pulse event and places the pulse event at the edge detector's output 410. The pulse event indicates the leading or falling edge of the envelope signal 405. The edge detector 410 is realized as an edge-to-glitch converter, an XOR gate and delay circuit, a differentiator circuit, or the like. The edge-to-glitch converter, the XOR gate, and delay circuit, the differentiator circuit are similarly known in the art and are commercially available.

The edge detector's output 415 is connected to an input of a time-to-digital converter 420. The time-to-digital converter 420 generates a time difference signal transferred to the output 430 of the time-to-digital converter 420. The time difference signal indicates the time between the rising edge or falling edge pulse event 405 and the pulse event 425. The pulse event 425 corresponds to the rising edge or the falling edge of the light source modulating signal as transferred from the modulation/scanning controller 175. The pulse event 425 is the trigger for starting the time-to-digital converter 420 in counting the time intervals. The pulse output 415 of the edge detector 410 provides the pulse event for terminating the counting of the time intervals by the time-to-digital converter 420. A series of time difference signals at the output 430 of the time-to-digital converter 420 is translated into the depth measurements to form images displayed by the computer 170.

Figure 2B:
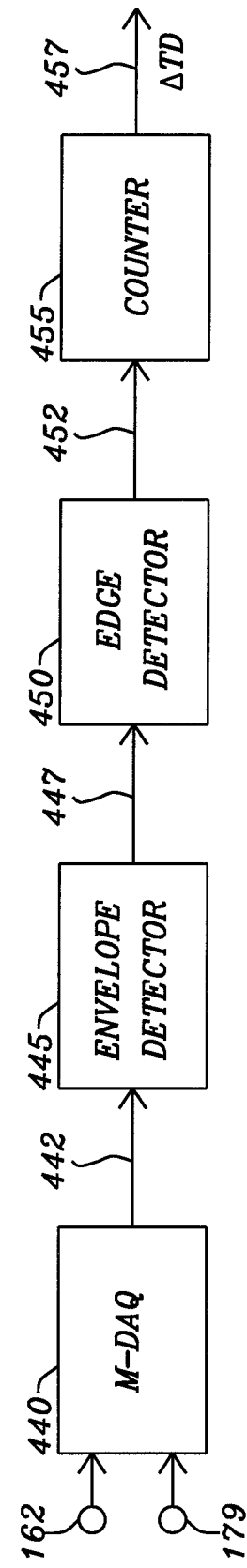
FIG. 2B is a block diagram of a program structure of a signal processor configured for performing an electrical TOI measurement embodying the principles of the present disclosure.

FIG. 2B is a block diagram of a program structure of a signal processor embodying the principles of the present disclosure. The interference electrical signal 162 of FIGS. 1A, 1B, and 1C generated from the balanced detector 160 is digitized by a data acquisition module 440. The data acquisition module 440 is triggered by the modulation/scan synchronization signal 179 from the modulation/scanning controller 175. The interference electrical signal is converted to a digitized signal 442 and is placed at the output of the data acquisition module 440. The maximum frequency of the interference electrical signal 162 corresponds to the minimum ranging depth of the TOI LiDAR system 100. The maximum frequency of the interference electrical signal 162 is greater than a Nyquist sampling frequency of the digitizer of the data acquisition module 440. The minimum frequency of the interference electrical signal corresponds to the maximum ranging depth of the TOI LiDAR system 100. The time delay of the detected interference electrical signal 162 is measured at the falling edge of the interference electrical signal's 162 envelope.

The digitized signal 442 is processed by an envelope detector process 445 executed by the signal processor 165 to determine an envelope signal 447 of the digitized interference electrical signal 442. The envelope detector process 445 is executed by taking the absolute value of a Hilbert transform of the digitized signal 442. The envelope signal 447 is then processed by an edge detection process 450 to identify the interference electrical signal's occurrence timing. The time difference 457 between the rising edge or the falling edge of the envelope signal 447 and modulation/scan synchronization signal 179 can be calculated.

Figure 2C:
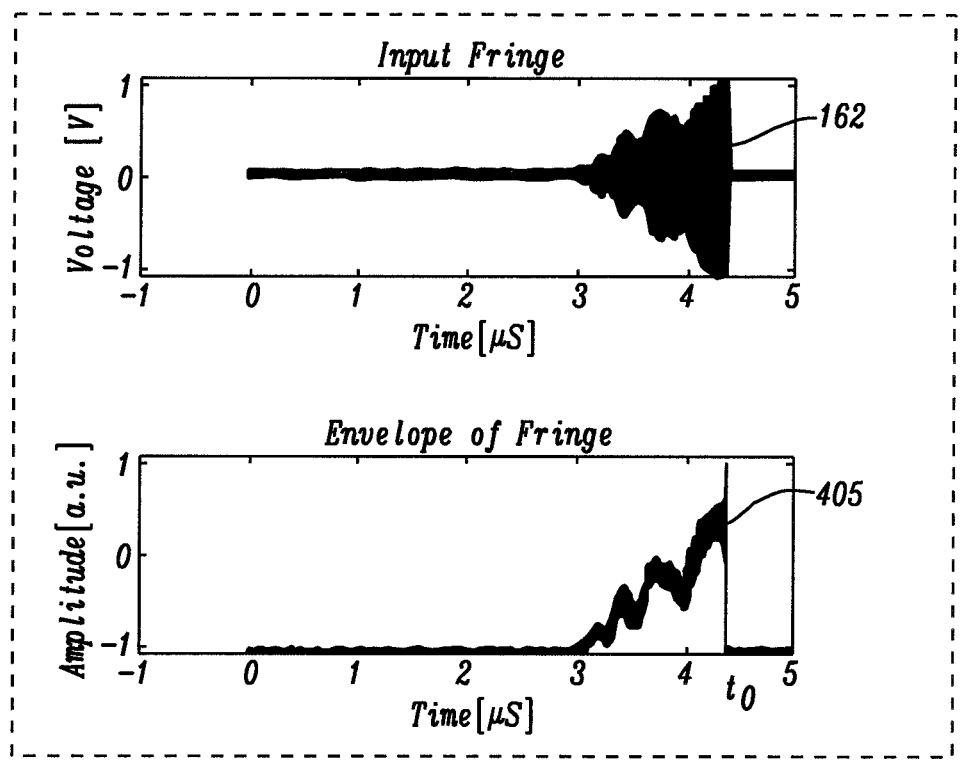
FIG. 2C is a plot of the sample arm's back-reflected pulse fringe at zero (0) meter location and envelope embodying the principles of the present disclosure.
Figure 2D:
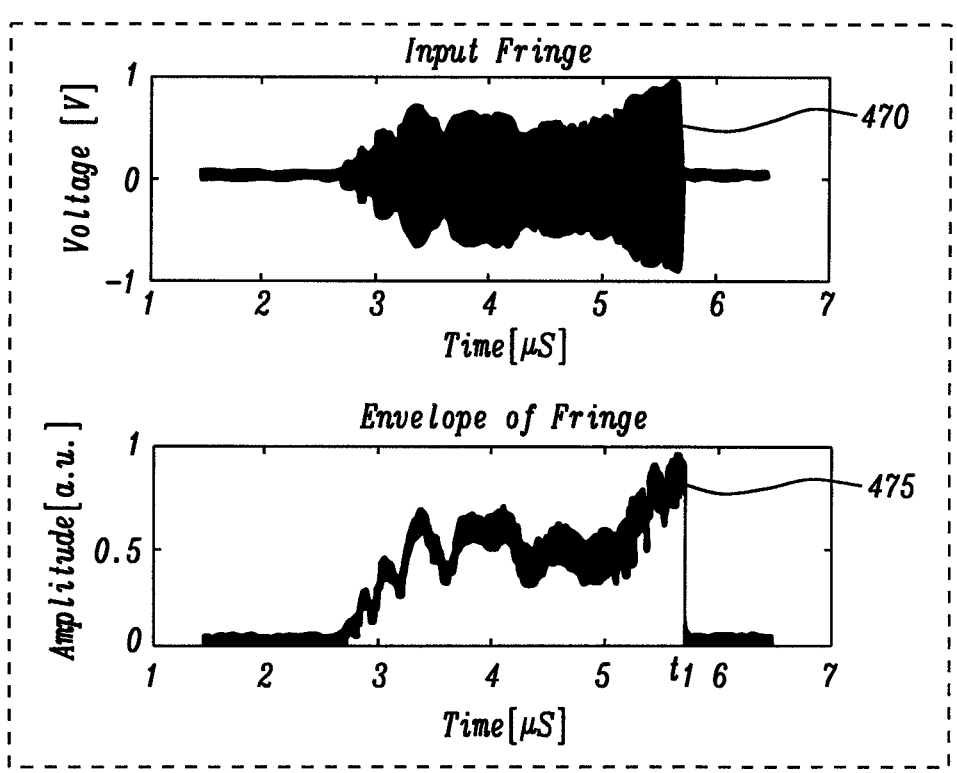
FIG. 2D is a plot of the sample arm's back-reflected pulse fringe at 180 meter location and envelope embodying the principles of the present disclosure.

FIG. 2C is a plot of the reference arm's pulse input fringe 460 and envelope 465 embodying the principles of the present disclosure. The plots of FIG. 2C are an example interference electrical signal of the prototype TOI system 100 detecting an object at a zero (0) meter location. FIG. 2D is a plot of the sample arm's back-reflected pulse fringe 470 and envelope 475 embodying the principles of the present disclosure. The plots of FIG. 2D are an example interference electrical signal of the prototype TOI system 100 detecting an object at a 180 m location. The edge detector 410 of FIG. 2A or the edge detector process 450 of FIG. 2B determines the time of the falling edge $t_0$ of the envelope of the reference arm 460 and the time of the falling edge $t_1$ of the envelope of the sample arm 475. The counter 420 or the counter process 455 counts the time interval between the reference arm's falling edge time $t_0$, and the sample arm's falling edge time $t_1$. The distance from the object being measured is determined by the equation:

$$\text{Distance} = c*(t_0 - t_1)$$

Where:
c is the speed of light.
$t_0$ is the reference arm's falling edge time.
$t_1$ is the sample arm's falling edge time.

A series of time differences 457 can be translated into the depth information and form images displayed by the computer 170.

Figure 3:
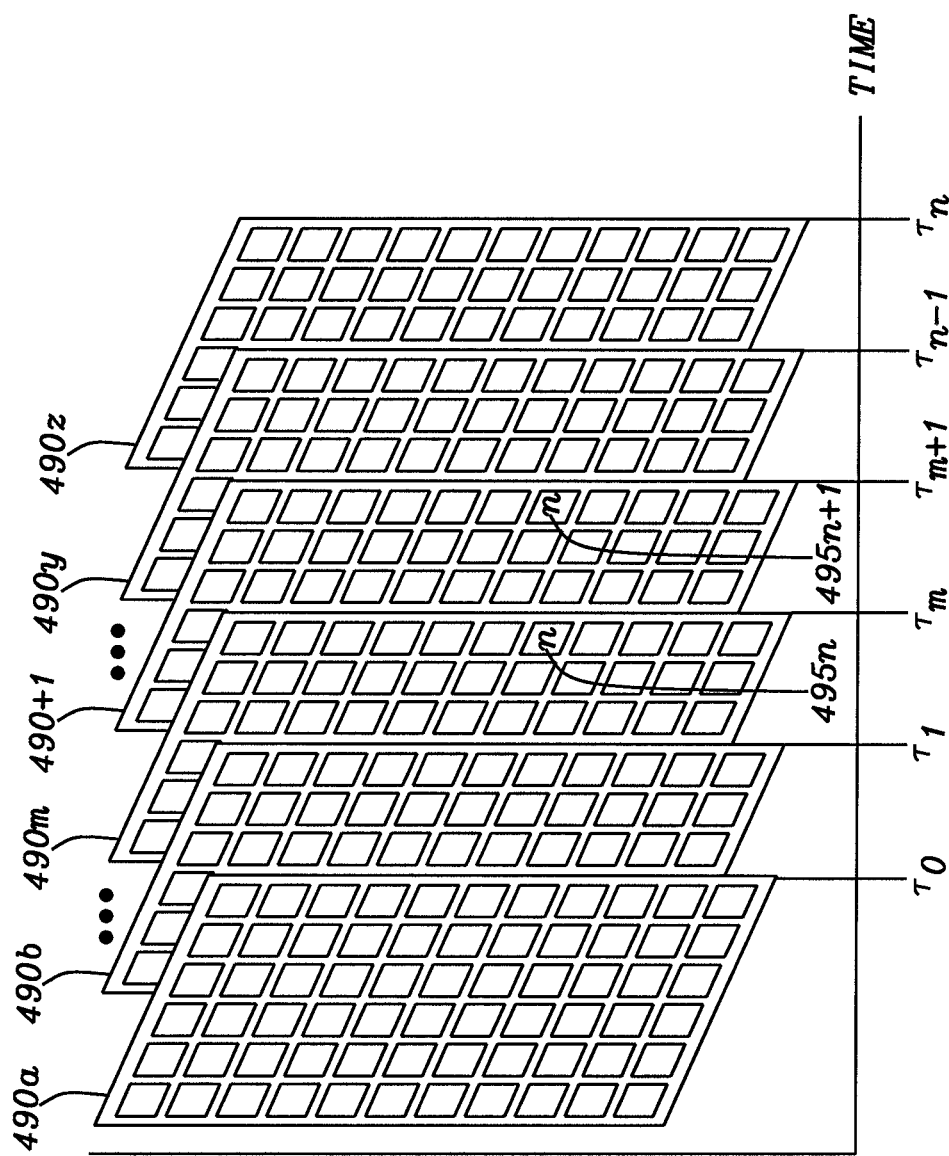
FIG. 3 illustrates the frame-based velocity measurement method of the TOI LiDAR system embodying the principles of the present disclosure.

FIG. 3 illustrates the frame-based velocity measurement method of the TOI LiDAR system embodying the principles of the present disclosure. Each frame 490a, 490a, 490b, ..., 490m, 490m+1, ..., 490y, 490z is captured by the balanced photodetector 160 of FIGS. 1A, 1B, and 1C and represents the data 495n and 495m+1. The data 495n and 495m+1 are transferred to the signal processor 165 and processed as described in FIGS. 2A and 2B to thus determine the rising edges or falling edges of the data. Therefore, the determination of the data's rising edges or falling edges provides the time difference between the data 495n and 495n+1. The distance between the data 495n and 495n+1 is then determined as the time difference $(t_{m+1} - t_m)$ between the data 495n and 495n+1. The time difference $(t_{m+1} - t_m)$ between the data 495n and 495m+1 is multiplied by the frame rate of the optical interference signal's sampling applied to optical paths 155a and 155b to determine the velocity of the object being measured.

Figure 4A:
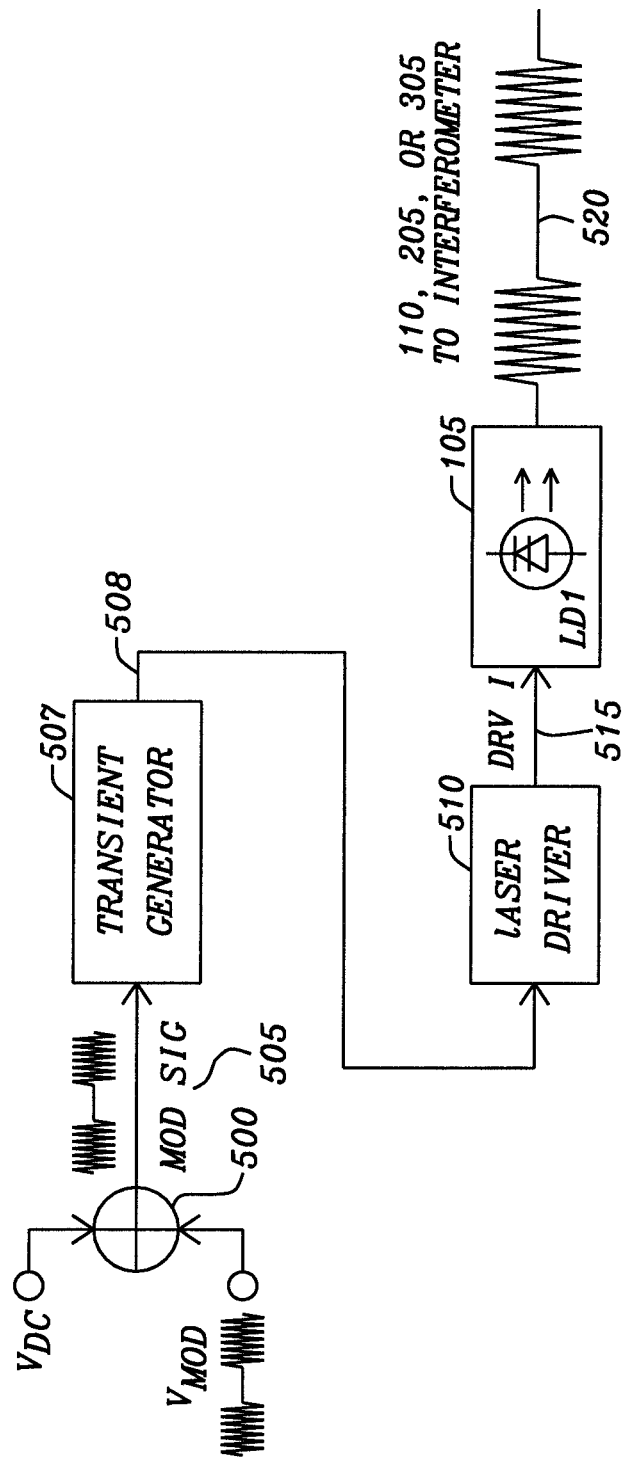
FIG. 4A is a block diagram of a transient light source modulator embodying the principles of this disclosure.

FIG. 4A is a block diagram of a small-signal transient modulator incorporated in the modulation driver of FIGS. 1A, 1B, and 1C embodying the principles of this disclosure. The transient light source modulator has a summing circuit 500 connected to receive a DC voltage source $V_{DC}$ and a modulating voltage $V_{MOD}$. The summing circuit 500 additively combines the DC voltage source $V_{DC}$ and the modulating voltage $V_{MOD}$ to form the modulating signal 505. The modulating signal 505 has an amplitude smaller than the Voltage source $V_{DC}$ voltage. The modulating signal 505 is chosen from the group of waveforms, including a square wave, triangular wave, sinusoidal wave, shark's tooth wave, or any arbitrary waveform, and even a combination of the waveforms. A transient generator 507 generates a spiked transient modulating signal 508 by introducing a voltage spike in the modulation signal 505. The spiked transient modulating signal 508 is applied to the laser driver 510. The voltage of the spiked transient modulating signal 508 is converted to a current to drive the coherent light source 105. The function of the transient generator 507 is to alter the effective inductance value of the transient light source modulator to generate a spiked transient current significantly large for reducing the response time of the laser driver 510 and thus overcomes the speed limitation of traditional laser driving methods. The schematic of the transient generator 507 is discussed hereinafter in FIG. 4B. Alternately, the converted current of the modulating signal 505 is applied to a thermoelectric cooling device that is used to stabilize the temperature of the laser diode of the coherent light source 105. By injecting the modulating current through the thermoelectric cooling device, the temperature of the laser diode of the coherent light source 105 is changed. The laser diodes of the coherent light source 105 have a built-in thermistor for monitoring the diode temperature for permitting the thermoelectric cooling device and the thermistor to form a control loop that provides temperature monitoring and precise temperature modulation.

The coherent light source 105 emits the coherent light signal 520 to the interferometer. The waveform modulation in wavelength/optical frequency is chosen to introduce optical interference where the optical path length difference between the sample arm 122 and reference arms 140 of FIG. 1A, 200 of FIG. 1B, and 305 of FIG. 1C.

Figure 4B:
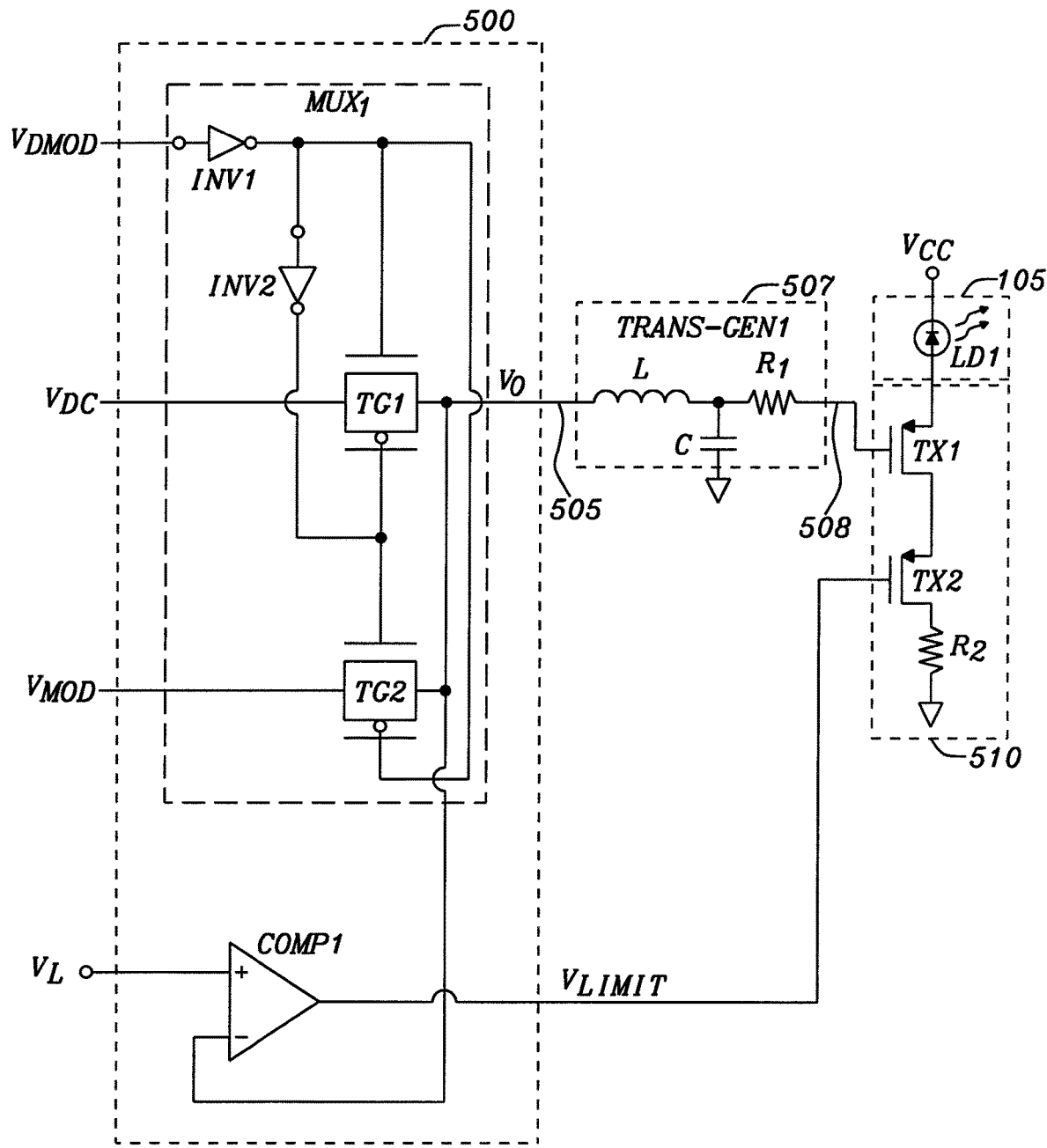
FIG. 4B is a schematic of the transient light source modulator and a coherent light source embodying the principles of the present disclosure.

FIG. 4B is a schematic of a transient light source modulator and a coherent light source embodying the principles of the present disclosure. The summing circuit 500 has a 2×1 multiplexer MUX1 that is used to combine a DC voltage source $V_{DC}$ and an analog modulation signal $V_{AMOD}$ that is controlled by a digital modulation signal $V_{DMOD}$. The first input of the 2×1 multiplexer MUX1 is DC voltage $V_{DC}$, providing a lower base voltage. The second input to the 2×1 multiplexer MUX1 is the modulating voltage $V_{MOD}$ which is a higher voltage for forming the output voltage. The 2×1 multiplexer MUX1 output $V_O$ provides the transient modulating signal 505, which is the input of the transient generator 507. The output of the transient generator 507 is the transient modulation signal 508 that is applied to the input of the laser driver 510. The Laser Driver 510 converts the transient modulation signal 508 to a current to drive the coherent light source 105.

The multiplexer MX1 is formed of two transfer gates TG1 and TG2. The two transfer gates TG1 and TG2 are connected in parallel. Each transfer gate of the two transfer gates TG1 and TG2, as is known in the art, has complementary NMOS and PMOS transistors connected. The sources and drains of each of the complementary NMOS and PMOS transistors are connected. The DC voltage source $V_{DC}$ and the modulating voltage $V_{MOD}$ are connected respectively to the sources transfer gates TG1 and TG2. The digital modulation signal $V_{DMOD}$ is connected to an input of a first inverter INV1. The output of the first inverter INV1 is connected to the input of the second inverter INV2. The output of the first inverter INV1 is connected to the out-of-phase gate of the transfer gate TG1 and to the in-phase gate of the transfer gate TG2. The output of the second inverter INV2 is connected to the out-of-phase gate of the transfer gate TG2 and to the in-phase gate of the transfer gate TG1.

The DC voltage source $V_{DC}$ is connected to the input source/drains of the transfer gate TG1 and a modulating voltage $V_{MOD}$ is connected to the input source/drains of the transfer gate TG2. The output source/drains of the transfer gate TG1 and the transfer gate TG2 are connected to the out-of-phase input of the comparator COMP1. The in-phase input of the comparator COMP1 is connected to a limit voltage source $V_L$. The comparator COMP1 compares the output voltage $V_O$ of the transfer gates TG1 and TG2 with the voltage level of the limit voltage source $V_L$. If the voltage level of the limit voltage source $V_L$ is greater than the output voltage $V_O$ of the transfer gates TG1 and TG2, the coherent light source 105 is shut down for safety purposes, as described hereinafter.

The 2×1 multiplexer MX1 has an output voltage $V_O$ that is applied as the output of the summing circuit 500 to and input of a transient generator 507. The transient generator

507 has an inductor L with a first terminal connected to the output $V_O$ of the 2×1 multiplexer MX1. The second terminal of the inductor L is commonly connected to the first terminal of capacitor C and resistor $R_1$. The second terminal of the capacitor C is connected to a ground reference source, and the second terminal is connected to the laser driver 510.

The laser driver 510 has a first NMOS transistor TX1 with a gate connected to the output of the transient generator 507. A drain of the MOS transistor TX1 is connected to the anode of the coherent light source LD1 105. The source of the first MOS transistor TX1 is connected to the drain of the second MOS transistor TX2. The source of the second MOS transistor TX2 is connected to a first terminal of a resistor $R_2$. The gate of the second MOS transistor TX2 is connected to the output of the comparator COMP1 for receiving a shutdown command for the coherent light source LD1 105. A second terminal of the resistor $R_2$ is connected to the ground reference voltage source. The resistor $R_2$ established the shutdown voltage for the coherent light source LD1 105. The NMOS transistor TX1 gate is configured as a current source to generate the laser current.

In the embodiment of the parent of the present disclosure, with no transient generator 507, the gate capacitance of the first MOS transistor TX1 and the resistance and the inductance on the wires connecting to the first MOS transistor TX1 have a negligible level of overshoot or spiking with the rise of the modulating signal 505. The inductance L, the large gate size of the first NMOS transistor TX1, and capacitor C on the wire boost the overshoot to create a current spike or transient signal because of the transition time of the switching of the output $V_O$ of the 2×1 multiplexer MX1. The level of the transient current spike is highly dependent on the rise time of the modulating signal 505 and parameters of the inductance L, and the gate size of the first NMOS transistor TX1. A positive spike occurs at the rising edge of the first NMOS transistor TX1 and the first NMOS transistor TX1. A negative spike occurs at the falling edge of the first NMOS transistor TX1 when switching back to the base voltage level of the DC voltage source $V_{DC}$. Therefore, there are two spike events at every switching of the modulating signal 505.

The switching pulse width of the modulating signal 505 plays an important role in driving the current source transistor TX1. At the rising edge, a current spike immediately occurs and keeps ringing. The current spike then gradually decreases to the charging voltage of the capacitor C to a voltage level equal to the amplitude of the modulating signal 505. At the falling edge of the modulating signal 505, a negative spike occurs when the 2×1 multiplexer MX1 is switched to return to the voltage level back to the base voltage level of the DC voltage source $V_{DC}$.

A key aspect is to control the switching pulse width of the modulating signal 505 to merge the positive and negative transient voltage spikes of the transient modulating signal 508. The merging of the positive and negative transient voltage spikes permits time for the voltage ringing and settling between the two spikes due to multiplexer MX1 switching on and off. The lesser the time between the positive and negative transient voltage spikes is better for the TOI LiDAR application. The time difference of the positive and negative transient voltage spikes will contribute to the TOI LiDAR range for detection (edge detection), considering if the detected object is very close to the LiDAR device.

The coherent light source 105 is a coherent light source 105. The coherent light source 105 is a type of laser diode, quantum cascade laser, or optical fiber laser where the device's active region contains a periodically structured element or diffraction grating. The power supply voltage source $V_{CC}$ is applied to the coherent light source LD1 105.

The high and low levels of the digital modulation signal $V_{DMOD}$ can turn on and off the coherent light source LD1 105, respectively. While the digital modulations signal $V_{DMOD}$ is high, the analog modulation signal $V_{AMOD}$ can provide a small signal modulation to the light source 105. The light source LD1 105 is deactivated when the output of the multiplexer $V_O$ is higher than a pre-defined limiting voltage $V_L$ with a short transition time by the second transistor TX2. A protective current limit setting is based on the properties of the NMOS gate TX2 and the coherent light source LD1 105 current limit. In this embodiment, the NMOS gate TX2 has a breakdown voltage at 20V, which is enough for protection. The coherent light source LD1 105 transient current is high, but this should not be a problem for the coherent light source LD1 (105 since the transient current has a duration of approximately one nanosecond.

While the digital modulation signal $V_{DMOD}$ transitions from low to high, the transient generator 507 produces a voltage spike, which switches on the first transistor TX1 that will immediately drain the current within the light source LD1, thus will generate a short transition time for TOI applications.

Figure 5A:
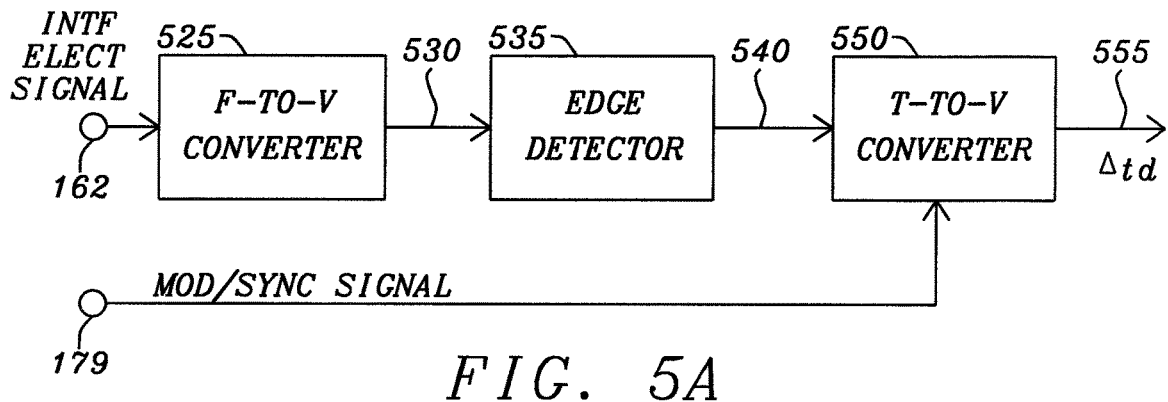
FIG. 5A is a block diagram of an SSM-TOI electrical measurement circuit embodying the principles of the present disclosure.

FIG. 5A is a block diagram of an SSM-TOI electrical measurement circuit embodying the principles of the present disclosure. The interference electrical signal 162 generated from the balanced detector 160 is received by a frequency-to-voltage converter 525. The frequency of the interference electrical signal 162 is converted to a voltage at the output 530 of the frequency-to-voltage converter 525. The voltage is proportional to the frequency of the interference electrical signal 162. The frequency-to-voltage converter 525 includes an FM demodulator, a frequency detector, or any frequency-to-voltage converter circuits known in the art. The voltage level at the output 530 is the input to the edge detector 535 that generates a pulse at the output 540 of the edge detector 535. The pulse corresponds to the rising edge, or the voltage level's rising edge or falling edge at the output 530 of the frequency-to-voltage converter 525. The edge detector 535 is formed by an edge-to-glitch converter, an XOR gate and delay circuit, a differentiator circuit, or any edge detector circuit known in the art. A time-to-digital converter 550 generates a time difference signal $\Delta_{TD}$ at the output 555 of the time-to-digital converter 550. The time difference signal $\Delta_{TD}$ contains the time difference between the rising edge or falling edge pulse at the output 540 of the edge detector 535 and the modulation/scan synchronization signal 179 from the modulation/scanning controller 175. A series of time differences 507 are translated into the depth to form images displayed by the computer 170.

Figure 5B:
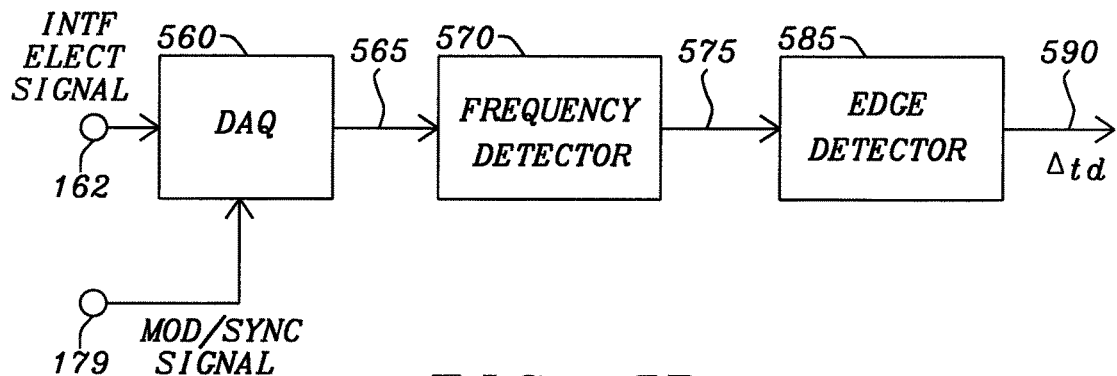
FIG. 5B is a block diagram of a program structure of a signal processor configured for performing an SSM-TOI electrical measurement embodying the principles of the present disclosure.

FIG. 5B is a block diagram of a program structure of a signal processor 175 configured for performing an SSM-TOI electrical measurement embodying the principles of the present disclosure. The interference electrical signal 162 generated from the balanced detector 160 is digitized by a data acquisition module 605 triggered by modulation/scan synchronization signal 179 from the modulation/scanning controller 175. The interference electrical signal 162 is converted to a digitized interference signal at the output 565. The maximum frequency of the interference electrical signal 162 corresponds to the minimum ranging depth of the TOI LiDAR system 100. The interference electrical signal 162 is greater than a Nyquist sampling frequency of the digitizer in the data acquisition module 605.

The minimum frequency of the optical interference signal as applied to optical paths 155a and 155b corresponds to the maximum ranging depth of the TOI LiDAR system 100. The time delay of the detected electrical interference 162 is measured at the falling edge of the interference electrical signal's 162 envelope. The interference digitized signal is processed by a frequency detector process 570 to identify its instantaneous frequency value at the output 575 of the frequency detector process 570. The frequency detector process 570 executes such methods as a short-time Fourier transformation, a wavelet transformation, or another frequency detector process known in the art. The instantaneous frequency value at the output 575 of the frequency detector process 570 is then processed by an edge detector process 585 to identify the occurrence of the timing of the rising edges or falling edges of the interference electrical signal 162, and the time difference $\Delta_{TD}$ at the output 590 of the edge detector process. The time difference $\Delta_{TD}$ is determined as the time between the rising edge or the falling edge of the instantaneous frequency value at the output 575 and the modulation/scan synchronization signal 179. A series of time differences $\Delta_{TD}$ are translated into the depth and form images displayed by the computer 170.

Figure 6:
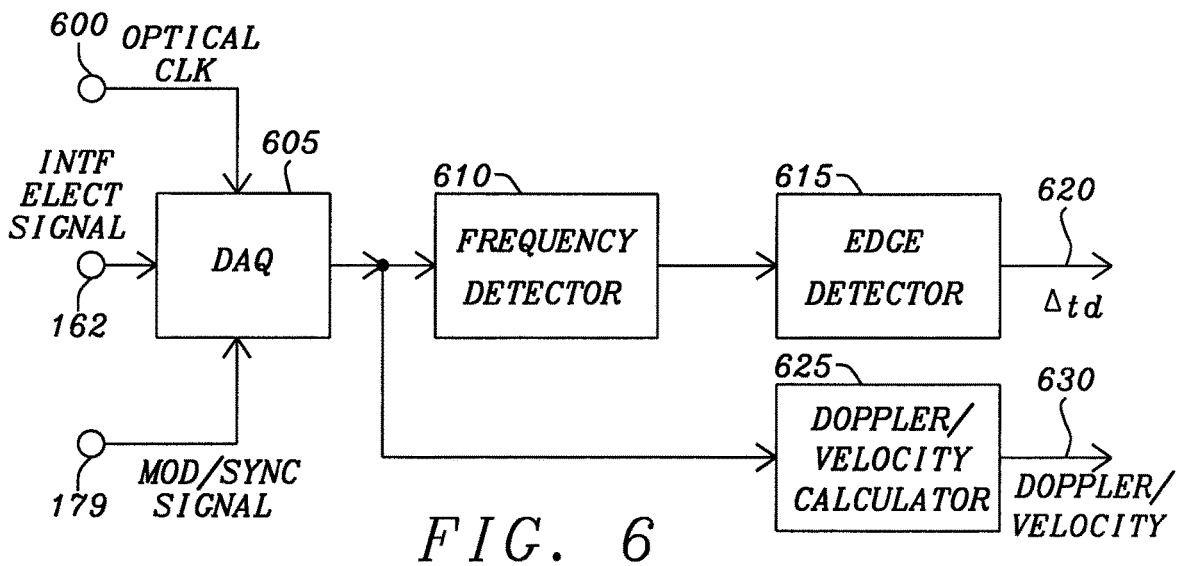
FIG. 6 is a block diagram of a digital signal processor configured for performing an SSM-TOI Doppler velocity measurement embodying the principles of the present disclosure.

FIG. 6 is a block diagram of a digital signal processor configured for performing an SSM-TOI Doppler velocity measurement embodying the principles of the present disclosure. FIG. 6 illustrates the sweep linearization correction performed by the sweep linearization calibrator 315 of FIG. 1C as utilized in the data acquisition and signal processor 165. When the TOI LiDAR system 100 operates under SSM-TOI mode, the speed information of the object being measured is encoded in the interference electrical signal 162. The interference electrical signal 162 as generated by the balanced photodetector 160 is digitized by a data acquisition module 605 triggered by the modulation/scan synchronization signal 179 from the modulating driver 175 and an optical frequency calibration clock 600 to convert the interference electrical signal 162 into a digitized signal at the output 607 of the data acquisition module 605. The digitized signal is linear in optical frequency space. The maximum frequency of the interference electrical signal 162 corresponds to the minimum ranging depth of the TOI LiDAR system 100. The interference electrical signal 162 is greater than a Nyquist sampling frequency of the data acquisition module 605.

The minimum frequency of the interference electrical signal 162 corresponds to the maximum ranging depth of the TOI LiDAR system 100. The time delay of the detected interference electrical signal 162 is measured at the interference electrical signal 162 envelope's falling edge. The optical frequency calibration clock 600 is generated from a Mach-Zehnder interferometer, a Fabry-Perot cavity, an etalon cavity, or any other interferometer or resonator suitable for generating the optical frequency calibration clock 600. The digitized signal 607 is an input to a frequency detector process 610 to determine the instantaneous frequency value. The instantaneous frequency value is the solution placed at the output 611 of the frequency detector process 610. In various embodiments, the optical frequency calibration clock 600 is not required when the digitized signal at the output 607 of the data acquisition module 605 is linear in optical frequency space intrinsically. The frequency detector may be realized in some implementations as a short-time Fourier transformation, wavelet transformation, or other appropriate frequency detector processes. The instantaneous frequency value at the output 611 of the frequency detector process 610 is then processed by an edge detector process 615 to identify the interference's occurrence timing. The edge detector process 615 then calculates the time difference $\Delta_{TD}$ between the rising edge or the falling edge of the instantaneous frequency value and the modulation/scan synchronization signal 179 and then places the time difference $\Delta_{TD}$ placed as the output 620 of the frequency detector process 610.

In other implementations of the SSM-TOI Doppler velocity measurement, the digitized inference electrical signal at the output 607 of the data acquisition module 605 is the input to a Doppler velocity calculation process 625 to calculate the moving velocity of the target. The moving velocity of the target is the output 630 of the Doppler velocity calculation process 625. The Doppler velocity calculation process 625 is realized, in one implementation of the Doppler velocity calculation process 625, by measuring the time difference $\Delta_{TD}$ between the frequency of the interference electrical signal 162 of the consecutive forward and backward sweeps that are proportional to the moving speed of the object being measured. The symmetry of the modulation/scan synchronization signal 179 minimizes the measurement error. A series of time differences $\Delta_{TD}$ at the output of the edge detector 620 and the moving speed of the object being measured can be translated into the depth and the velocity, respectively, and form images displayed by the computer 170. In some implementations of the SSM-TOI Doppler velocity measurement, the velocity introduced Doppler frequency shift in the interference electrical signal 162 may be directly extracted using at least one low pass filter. The frequency shift can be detected and converted to a velocity electrical signal with no digital signal processing required.

Figure 7:
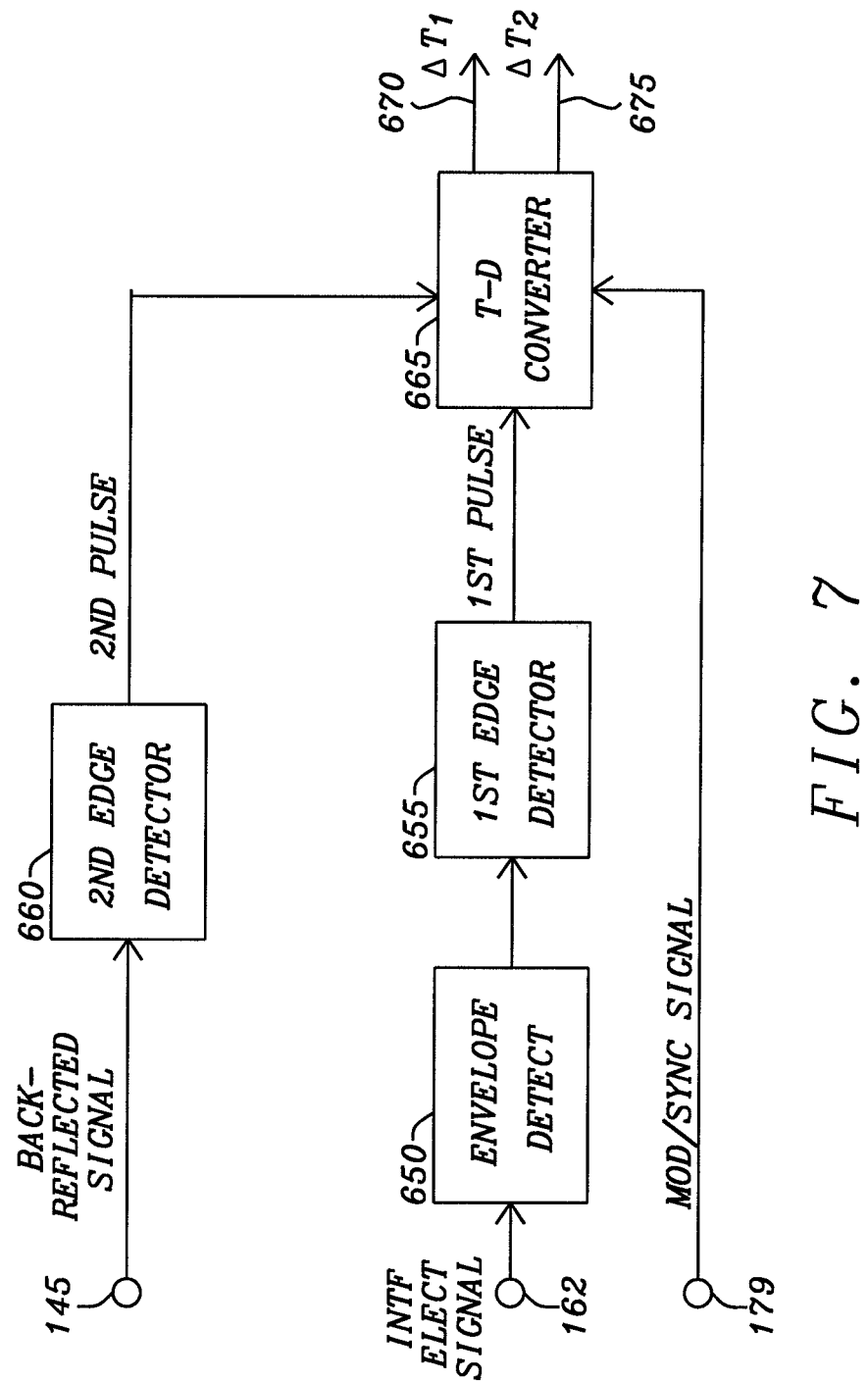
FIG. 7 is a block diagram of an integrated TOI and Time-of-Flight circuit embodying the principles of the present disclosure.

FIG. 7 is a block diagram of an integrated time-of-interference and time-of-flight circuit embodying the principles of the present disclosure. The interference electrical signal 162 generated from the balanced photodetector 160 is transferred to an envelope detector 650. The envelope detector 650 determines an envelope signal of the interference electrical signal 162 applied to the output 652 of the envelope detector 650. The envelope detector 650 is implemented as a radiofrequency (RF) power detector, a root mean square (RMS) detector, or a frequency demodulator. The envelope signal of the interference electrical signal 162 is then passed through a first edge detector 655. The first edge detector 655 generates a first pulse signal at the output 657 of the first edge detector 655 corresponding to the rising edge or the falling edge of the envelope signal of the interference electrical signal 162 at the output 657 of the envelope detector 650. The edge detector 655 is formed by an edge-to-glitch converter, an XOR gate and delay circuit, a differentiator circuit, or any edge detector circuit known in the art.

An electrical signal from the back-reflected coherent light 145 is extracted from a monitor channel of the balanced detector 160 to form a back-reflected electrical signal 145. The back-reflected electrical signal 145 from the monitor channel is the back-reflected electrical signal's 145 power spectrum and can be considered an envelope signal. The back-reflected electrical signal 145 is the input of the second edge detector 660. The second edge detector 660 generates a second pulse signal at the output 662 of the second edge detector 660.

The first pulse signal at the output 657 of the first edge detector 655, the second pulse signal at the output 662 of the second edge detector 660, and the modulation/scan synchronization signal 179 are applied to a multichannel time-to-digital converter 665. The multichannel time-to-digital converter 665 generates a first time difference signal at the output 670 of the time-to-digital converter 665. The first time difference signal $\Delta_{TD1}$ is a digitized representation of the time between the rising edge or falling edge of the first pulse signal and modulation/scan synchronization signal 179 corresponding to the rising edge or the falling edge of the light source modulation/scan synchronization signal 179.

The multichannel time-to-digital converter 665 generates a second time difference signal $\Delta_{TD2}$ between the rising edge or falling edge of the second pulse signal at the output 662 of the second edge detector 660 and the modulation/scan synchronization signal 179 corresponding to the rising edge or the falling edge of the light source modulation. The first time difference signal $\Delta_{TD1}$ and the second time difference signal $\Delta_{TD2}$ are averaged or weighted average. The averaged or weighted averaged first time difference signal $\Delta_{TD1}$ and the second time difference signal $\Delta_{TD2}$ are translated into the depth and form images displayed by the computer 170.

Figure 8A:
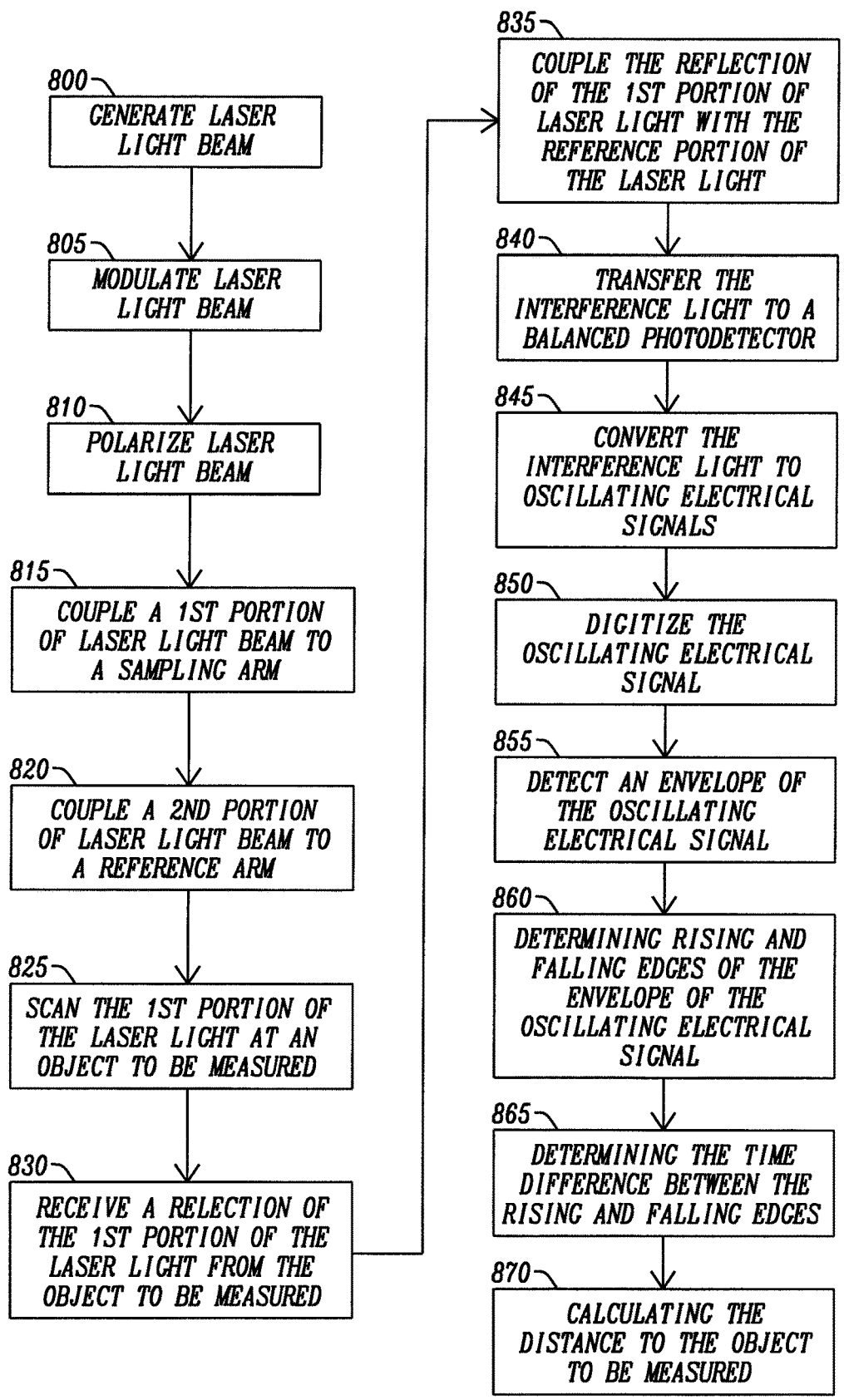
FIG. 8A is a flowchart of a method for determining an object's distance employing SSM-TOI electrical measurement embodying the principles of the present disclosure.

FIG. 8A is a flowchart of a method for determining an object's distance employing SSM-TOI electrical measurement embodying the principles of the present disclosure. A laser light beam is generated (Box 800). The laser light beam is modulated (Box 805) with a wavelength-modulated or frequency-modulated signal to adjust the laser light beam's wavelength or frequency. The laser light beam is then polarized (Box 810) to adjust the laser light's polarization states to maximize the amplitude of the optical interference signal or interference electrical signal.

The first portion of the laser light beam is coupled (Box 815) to a sampling fiberoptic cable. A second portion of the laser light beam is coupled (Box 820) to a reference optical path. The first portion of the laser light beam is scanned (Box 825) at an object whose distance from the modulated laser light source is determined.

A fractional part of the first portion of the laser coherent light beam is back-reflected and received (Box 830) from the object to be measured. The back-reflected portion of the first portion of the laser light beam is coupled (Box 835) with the second portion of the laser light beam to form the optical interference coherent light signal. The optical interference coherent light signal is transmitted (Box 840) to a balanced optical photodetector to convert (Box 845) the optical interference coherent light signal to an oscillating electrical interference signal. The oscillating electrical interference signal is digitized (Box 850). The maximum frequency of the interference electrical signal corresponds to the minimum ranging depth of the TOI LiDAR system and is greater than a Nyquist sampling frequency of the digitization. The minimum frequency of the interference electrical signal 162 corresponds to the maximum ranging depth of the TOI LiDAR system 100.

The digitized electrical interference signal envelope undergoes an envelope detection process to identify (Box 855) the envelope of the digitized electrical interference signal. The times of the rising or the falling edges of the envelope rising or falling edges of the envelope of the digitized electrical interference signal are determined (Box 860). The time difference between the rising or falling edges of the envelope of the digitized electrical interference signal and a modulation/scan synchronization signal is determined (Box 865), and the distance to the object to be measured is calculated (Box 870).

Figure 8B:
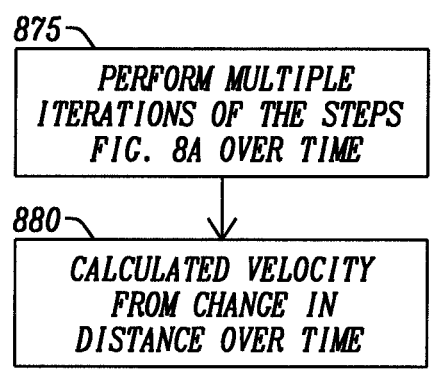
FIG. 8B is a flowchart of a method for determining an object's velocity employing SSM-TOI electrical measurement embodying the principles of the present disclosure.

FIG. 8B is a flowchart of a method for determining an object's velocity employing SSM-TOI electrical measurement embodying the principles of the present disclosure. The method for determining an object's velocity utilizing SSM-TOI electrical measurement begins with performing (Box 875) the steps of the method of FIG. 8A iteratively. The object's velocity is determined (Box 880) as the change in distance over time.

While this disclosure has been particularly shown and described with reference to the preferred embodiments thereof, it will be understood by those skilled in the art that various changes in form and details may be made without departing from the spirit and scope of the disclosure. Particularly, the TOI LiDAR system 100 of FIG. 1A, FIG. 1B, or FIG. 1C may be implemented as fiber optics, bulk optics, integrated photonic circuitry, or any combination of optical photonic devices known in the art.

What is claimed is:

1. A high-speed time-of-interference (ToI) detection and ranging (LiDAR) system for measuring the distance from the ToI LiDAR system to an object based on time-frequency domain reflectometry, comprising:

a coherent light source;

a modulating controller connected to the coherent light source and configured for generating and controlling a pulse width of a pulsed wavelength control signal that is transferred to the coherent light source for modulating the coherent light source to generate a pulsed wavelength-modulated coherent light emission, and comprising a transient generator for generating a positive transient voltage spike and a negative transient voltage spike and the controlling of the transient modulating signal to merge the positive transient voltage spike and the negative transient voltage spike for permitting time for voltage ringing and settling between the two spikes;

an interferometer connected with the coherent light source for receiving the pulsed wavelength-modulated coherent light emission and configured for partitioning the pulsed wavelength-modulated coherent light emission into a sample portion and a reference portion, wherein the sample portion of the pulsed wavelength-modulated coherent light emission is arranged to impinge upon the object to be measured, and the reference portion of the pulsed wavelength-modulated coherent light emission is arranged to provide a basis for determining the distance from the TOI LiDAR system to the object;

a scanner comprising a graded-index fiber rod having an engineered surface possessing a low numerical aperture for emission and a high numerical aperture for receiving connected to the interferometer to receive the sample portion of the pulsed wavelength-modulated coherent light, wherein the scanner is configured to physically transfer the pulsed wavelength-modulated coherent light's sample portion to the object and to scan the surface of the object with the pulsed wavelength-modulated coherent light, and the scanner is further configured to receive a back-reflected portion of the pulsed wavelength-modulated coherent light and transfer the back-reflected portion from the scanner to the interferometer;

wherein the back-reflected portion of the pulsed wavelength modulated coherent light is coupled with the reference portion of the pulsed wavelength-modulated coherent light to form an optical interference light signal;

a photodetector array configured to receive the optical interference light signal and convert the optical interference signal to an electrical interference signal;

a signal processor in communication with the photodetector array to receive the electrical interference signal and convert the electrical interference signal to convert it to a digitized electrical interference signal; and a computer system configured to calculate the time delay determined by the optical interference signal and generate a displayed imaging range based on the distance from the target.

2. The time-of-interference LiDAR system of claim 1 wherein the modulating controller with the transient generator is configured to modulate the coherent light source by controlling the coherent light source's driving current, adjusting the temperature of the narrow bandwidth light source, or adjusting the phase of the light emitted from the light source, wherein the transient generator comprises an inductance, a capacitance, and a resistance configured for generating the positive transient voltage spike and the negative transient voltage spike.

3. The time-of-interference LiDAR system of claim 1 wherein the interferometer comprises:
    a first coupler configured to receive the pulsed wavelength-modulated coherent light from the coherent light source and configured to divide the pulsed wavelength-modulated coherent light into a first portion of the pulsed wavelength-modulated coherent light and a second portion of the pulsed wavelength-modulated coherent light;
    a circulator connected to receive the first portion of the pulsed wavelength-modulated coherent light and configured such that the first portion of the pulsed wavelength-modulated coherent light enters a first port of the circulator and exits from the subsequent port to direct the first portion of the pulsed wavelength-modulated coherent light to the scanner;
    a sample arm connected to the first coupler to receive the first portion of the pulsed wavelength-modulated coherent light and transfer the first portion of the pulsed wavelength-modulated coherent light to the scanner;
    a reference arm connected to the first coupler to receive the second portion of the pulsed wavelength-modulated coherent light; and
    a second coupler configured to receive the back-reflected portion of the pulsed wavelength modulated coherent light, configured to receive the second portion of the pulsed wavelength modulated coherent light from the reference arm, and configured to couple the back-reflected portion of the pulsed wavelength modulated coherent light and the second portion of the pulsed wavelength modulated coherent light to form an optical interference light signal.

4. The time-of-interference LiDAR system of claim 3 wherein the interferometer further comprises:
    a polarization controller configured to receive the pulsed wavelength-modulated coherent light emission, transfer the pulsed wavelength-modulated coherent light emission to the first coupler, and configured to adjust the polarization states of the coherent light emission from the light source and maximize the amplitude of the optical interference signal or interference electrical signal.

5. The time-of-interference LiDAR system of claim 1 wherein the photodetector array is configured as a polarization-diversity balanced amplified detector and comprises at least one power monitor to measure the input power level to the photodetector array, wherein the power monitor output provides a modulated power level with a time delay associated with the object's distance.

6. The time-of-interference LiDAR system of claim 3 wherein the reference arm has a length greater than the sample arm's length, and the reference arm's optical path length is more than two times the system's maximum ranging depth.

7. The time-of-interference LiDAR system of claim 1 wherein the maximum frequency of the optical interference signal corresponds to the system's minimum ranging depth.

8. The time-of-interference LiDAR system of claim 1 wherein the signal processor is configured for determining an envelope of a digitized electrical interference signal.

9. The time-of-interference LiDAR system of claim 8 wherein the signal processor is configured to measure a time delay of the digitized electrical interference signal at a falling edge of the envelope of the digitized electrical interference signal.

10. The time-of-interference LiDAR system of claim 1 further comprises a scan controller configured to create the scan pattern that generates a scan synchronization signal and configured to apply the scan synchronization signal to the scanner to generate scan patterns that achieve the collection of the measurement information describing the object.

11. The time-of-interference LiDAR system of claim 1 wherein the time-of-interference LiDAR system is implemented as fiberoptics, bulk optics, integrated photonic circuitry, or any combination of optical photonic devices.

12. The time-of-interference LiDAR system of claim 2 wherein the graded-index fiber rod has an engineered surface formed on a distal end of the graded-index fiber rod to provide a low numerical aperture as required of the graded-index fiber rod and the engineered graded-index lens for long-distance illumination and a higher numerical aperture required for receiving back-reflected pulsed wavelength-modulated coherent light from the object.

13. The time-of-interference LiDAR system of claim 1 wherein the graded-index fiber rod is formed with a separate lens in contact with the graded-index fiber rod to provide the low numerical aperture as required of the graded-index fiber rod and the engineered graded-index lens for long-distance illumination and the higher numerical aperture required for receiving back-reflected pulsed wavelength-modulated coherent light from the object.

14. The time-of-interference LiDAR system of claim 1 wherein the transient generator alters the effective inductance value of the transient light source modulator to generate a spiked transient for significantly reducing the response time of the laser driver and thus overcoming any speed limitation.

15. A method for determining an object's distance comprising the steps of:
    generating a coherent light beam;
    modulating the coherent light beam with a wavelength modulated signal;
    coupling a first portion of the coherent light beam to a sample arm;
    coupling a second portion of the coherent light beam to a reference arm;
    generating a positive transient voltage spike and the negative transient voltage spike for the controlling coherent light beam;
    scanning the first portion of the coherent light beam through a low numerical aperture portion of a graded-index fiber rod with an engineered surface at an object whose distance from a source of the wavelength modulated coherent light beam is to be measured;
    reflecting back from the object to be measured a portion of the first portion of the wavelength modulated coherent light beam through a high numerical aperture of a graded-index fiber rod with an engineered surface;

receiving the back-reflected portion of the wavelength modulated coherent light beam from the object to be measured;
coupling the back-reflected portion of the coherent light beam with the second portion of the coherent light beam to form an optical interference coherent light signal;
photodetecting the optical interference wavelength modulated coherent light signal to form an oscillating electrical interference signal;
digitizing the oscillating electrical interference signal;
detecting an envelope of the digitized electrical interference signal for determining the envelope of the digitized electrical interference signal;
determining the times of rising or falling edges of the envelope of the digitized electrical interference signal;
determining the time difference between the rising or falling edges of the envelope of the digitized electrical interference signal; and
calculating a distance to the object to be measured is calculated.

16. The method of claim 15 further comprises the steps of:
determining the object's velocity by performing the steps of claim 15 iteratively; and
calculating the object's velocity as the change in distance over time.

17. The method of claim 15 further comprises the step of:
adjusting polarization states of the coherent light beam to maximize the amplitude of the optical interference signal or interference electrical signal.

18. The method of claim 15 wherein a maximum frequency of the interference electrical signal corresponds to a minimum ranging depth of the measured distance to the object, and a maximum frequency of the interference electrical signal is greater than a Nyquist sampling frequency of the step of digitizing the interference electrical signal.

19. The method of claim 18 wherein the minimum frequency of the interference electrical signal corresponds to the maximum ranging depth of measuring the object's distance.

20. The method of claim 15 further comprises the step of implementing the method with fiberoptics, bulk optics, integrated photonic circuitry, or any combination of optical photonic devices.

21. The method of claim 15 further comprises fabricating the graded-index fiber rod by the steps of:
engineering the graded-index fiber rod to have a low numerical aperture as required of the graded-index fiber rod for long-distance illumination and a higher numerical aperture required for receiving back-reflected pulsed wavelength-modulated coherent light from the object.

22. The method of claim 21 further comprises:
fabricating the graded-index fiber rod by the step of:
providing a separate lens to contact with the graded-index fiber rod to provide the low numerical aperture as required of the graded-index fiber rod and the engineered graded-index lens for long-distance illumination and the higher numerical aperture required for receiving back-reflected pulsed wavelength-modulated coherent light from the object.

23. The method of claim 15 further comprises the steps of:
providing a transient generator configured for altering the effective inductance value of a transient light source modulator to generate a spiked transient for significantly reducing the response time of a laser driver and thus overcoming any speed limitation.

24. An apparatus for determining an object's distance comprising:
means for generating a coherent light beam;
means for modulating the coherent light beam with a transient wavelength-modulated signal to adjust the amplitude of the coherent light beam;
means for coupling a first portion of the coherent light beam to a sample fiberoptic cable;
means for coupling a second portion of the coherent light beam to a reference arm;
means for generating a positive transient voltage spike and a negative transient voltage spike for the controlling coherent light beam;
means for scanning the first portion of the coherent light beam with a low numerical aperture through a graded-index fiber rod with an engineered surface is scanned at an object whose distance from a source of the modulated coherent light beam is to be measured;
means for reflecting back from the object to be measured a portion of the first portion of the coherent light beam is through a high numerical aperture of a graded-index fiber rod with an engineered surface;
means for receiving the back-reflected portion of the coherent light beam with high numerical aperture from the object to be measured;
means for coupling the back-reflected portion of the coherent light beam with the second portion of the coherent light beam to form an optical interference coherent light signal;
means for photodetecting the optical interference coherent light signal to form an oscillating electrical interference signal;
means for digitizing the oscillating electrical interference signal;
means for detecting an envelope of the digitized electrical interference signal for determining the envelope of the digitized electrical interference signal;
means for determining the times of rising and falling edges of the envelope of the digitized electrical interference signal;
means for determining the time difference between the rising or falling edges of the envelope of the digitized electrical interference signal; and
means for calculating a distance to the object to be measured is calculated.

25. The apparatus of claim 24 further comprises:
means for determining the object's velocity by iteratively activating the means of claim 24 for determining the object's distance over multiple iterations of claim 24; and
means for calculating the object's velocity as the change in the object's distance over time.

26. The apparatus of claim 24 further comprises:
means for adjusting polarization states of the coherent light beam to maximize the amplitude of the optical interference signal or interference electrical signal.

27. The apparatus of claim 24 wherein a maximum frequency of the interference electrical signal corresponds to a minimum ranging depth of measuring the distance to the object and is greater than a Nyquist sampling frequency of the means for digitizing the interference electrical signal.

28. The apparatus of claim 24 further comprises:
means for engineering a surface of the graded-index fiber rod to provide a low numerical aperture as required of the graded-index fiber rod and the engineered graded-index lens for long-distance illumination and a higher numerical aperture required for receiving back-reflected pulsed wavelength-modulated coherent light from the object.

29. The apparatus of claim 24 further comprises:

means for fabricating the graded-index fiber rod by providing a separate lens to contact the graded-index fiber rod to provide the low numerical aperture as required of the graded-index fiber rod and the engineered graded-index lens for long-distance illumination and the higher numerical aperture required for receiving back-reflected pulsed wavelength-modulated coherent light from the object.

30. The apparatus of claim 24 further comprises:

means for providing a transient generator configured for altering the effective inductance value of a transient light source modulator to generate a spiked transient for significantly reducing the response time of a laser driver and thus overcoming any speed limitation.

* * * * *